May 23, 1967 L. H. ADAMSON 3,321,747

MEMORY PROTECTION SYSTEM

Filed Oct. 2, 1964 10 Sheets-Sheet 1

INVENTOR
LESLIE H. ADAMSON,
BY
Walter J. Adam
ATTORNEY.

INVENTOR.
LESLIE H. ADAMSON,
BY
Walter J. Adam
ATTORNEY.

INVENTOR.
LESLIE H. ADAMSON,
BY
Walter J. Adam
ATTORNEY.

May 23, 1967 L. H. ADAMSON 3,321,747

MEMORY PROTECTION SYSTEM

Filed Oct. 2, 1964 10 Sheets-Sheet 4

INVENTOR
LESLIE H. ADAMSON,
Walter J. Adam
ATTORNEY.

May 23, 1967 L. H. ADAMSON 3,321,747

MEMORY PROTECTION SYSTEM

Filed Oct. 2, 1964 10 Sheets-Sheet 5

INVENTOR.
LESLIE H. ADAMSON,
BY
Walter J. Adam
ATTORNEY.

May 23, 1967 L. H. ADAMSON 3,321,747

MEMORY PROTECTION SYSTEM

Filed Oct. 2, 1964 10 Sheets-Sheet 6

INVENTOR.
LESLIE H. ADAMSON,
BY
Walter J. Adam
ATTORNEY

INVENTOR.
LESLIE H. ADAMSON,
Walter J. Adam
ATTORNEY.

MEMORY PROTECTION SYSTEM

Filed Oct. 2, 1964

INVENTOR.
LESLIE H. ADAMSON,
BY
Walter J. Adam
ATTORNEY.

INVENTOR
LESLIE H. ADAMSON,
BY
Walter J Adam
ATTORNEY.

May 23, 1967 L. H. ADAMSON 3,321,747

MEMORY PROTECTION SYSTEM

Filed Oct. 2, 1964 10 Sheets-Sheet 10

United States Patent Office 3,321,747

Patented May 23, 1967

3,321,747

MEMORY PROTECTION SYSTEM

Leslie H. Adamson, Tustin, Calif., assignor to Hughes Aircraft Company, Culver City, Calif., a corporation of Delaware Filed Oct. 2, 1964, Ser. No. 401,173
16 Claims. (Cl. 340—172.5)

This invention relates to computer systems and particularly to a system for protecting the memory from loss of information during power failures or transients and for automatically restarting the computer operation upon correction of the failure or transient condition.

In magnetic computer memories, information is conventionally selected to be read therefrom or information is written into selected positions in the memory by current pulses or by the coincidence of current pulses. For example, a normal read-write cycle may be utilized in which a coincidence of X and Y current pulses interrogate the stored information during reading by switching all cores or other magnetic storage elements at a selected word position to the "zero" state, for example. During writing the cores of the selected word are switched to a "one" state except those cores to which an inhibit current is applied to prevent the writing of a "one" state. Reading and writing by combinations of current pulses is performed by other arrangements as are well known in the art, such as in a memory system having a linear select organization.

The information stored in magnetic memories is normally destroyed or partially destroyed whenever the A.C. (alternating current) line voltage supplying the voltage regulation circuits, falls below acceptable limits. Because power failure is characteristically relatively slow compared to the speed of computer operation, a plurality of memory cycles may occur while the A.C. power is falling in level and the driving and switching currents have decreasing and variable amplitudes. The destruction of stored information results from improper driving currents being applied to the memory during both the read and the write cycles. Also, as the D.C. (direct current) voltages fail, logical control of memory drive circuits is lost and large currents of undefined durations pass through the memory as filter capacitors discharge in the supply circuits such as the sources of driving currents.

The implications of such a loss of stored information may depend upon the function which the computer is performing at the occurrence of the fault condition. If the computer is engaged in the solution of a lengthy problem, it will be necessary to re-enter into the computer any part of the program that has been destroyed, that is, perform a program load operation which conventionally requires a relatively long time. Also, the solution of the problem must be started at the beginning. Thus a voltage transient on the A.C. power line is conventionally very costly in terms of useful computer time. When a computer is being utilized for real time applications, the lost information may no longer be available such as when the information is loaded into memory directly from a source such as radar, resulting in a complete mission or problem failure. Also, as previously discussed, the program must be re-entered into the memory before the calculation routine may be continued.

One of the problems involved in a memory protection system is that by the time the D.C. power supplies indicate a failed condition, the voltage has already fallen to a point such that information may be destroyed or lost. Also, the failing voltage may prevent the protection system from completing its operation. Another problem in memory protection is that even if the voltages supplied to the memory are turned off upon occurrence of a voltage failure, the memory may be inactivated at such a time that information is destroyed in addressed words. A memory protect system that anticipates a failure condition, positively inhibits the memory and computer at a proper time and that automatically restarts the computer and memory system after the failure has been corrected, would be very advantageous to the computer art. In real time computer systems, the automatic starting of the computer after removal of a voltage transient is especially advantageous.

It is therefore an object of the invention to provide a system for protecting a memory from loss of information during power failures or voltage transients.

It is a further object of this invention to provide a memory protection system that anticipates variations of regulated voltages from an in-tolerance condition.

It is another object of this invention to provide a memory protection system that removes the driving currents from the memory during a voltage failure condition and restores the driving currents upon removal of the failure condition and when the voltage regulators have returned to normal operations.

It is still another object of this invention to provide a memory protection system that inhibits the current sources upon the occurrence of a failure condition, regardless of loss of logical control.

It is another object of the invention to provide a memory protection system that controls the memory to complete a current operating cycle in response to a line voltage fault and controls the computer to automatically re-enter the computer program when the line voltage fault has disappeared.

It is another object of the invention to provide a memory protect system in which a separate power supply system is not required to inhibit the memory during the time of failing voltages and loss of logical control.

Briefly, the memory protection system in accordance with the principles of the invention, samples one of the unregulated D.C. voltages to anticipate failures by the voltage regulators and to apply a signal to the phase counters of the memory for halting the memory operation only at completion of its present cycle. The driving current sources are also inhibited for a fixed minimum time interval while the supply voltages are removed therefrom after de-energization of a relay. A signal is also developed to set the computer to a clear or non-operative condition and to develop a return address for the computer to utilize when returning to normal operation. When the unregulated D.C. voltage returns to a normal in-tolerance condition, the relay is energized and the memory is enabled after a predetermined minimum time delay to allow the various D.C. supply voltages to reach an in-tolerance condition. A signal is also applied to the computer to initiate a control sequence to start the computing operation at a desired point in the program and a signal is developed and applied to the phase counters to allow normal memory operation to proceed. Thus the system allows the computer to automatically start at the proper program re-entrance point after the failure condition is removed and proper voltages are again applied to the memory and computer system.

The novel features of this invention, as well as the invention itself, both as to its organization and method of operation, will best be understood from the accompanying description taken in connection with the accompanying drawings in which like characters refer to like parts, and in which.

Figure 1:
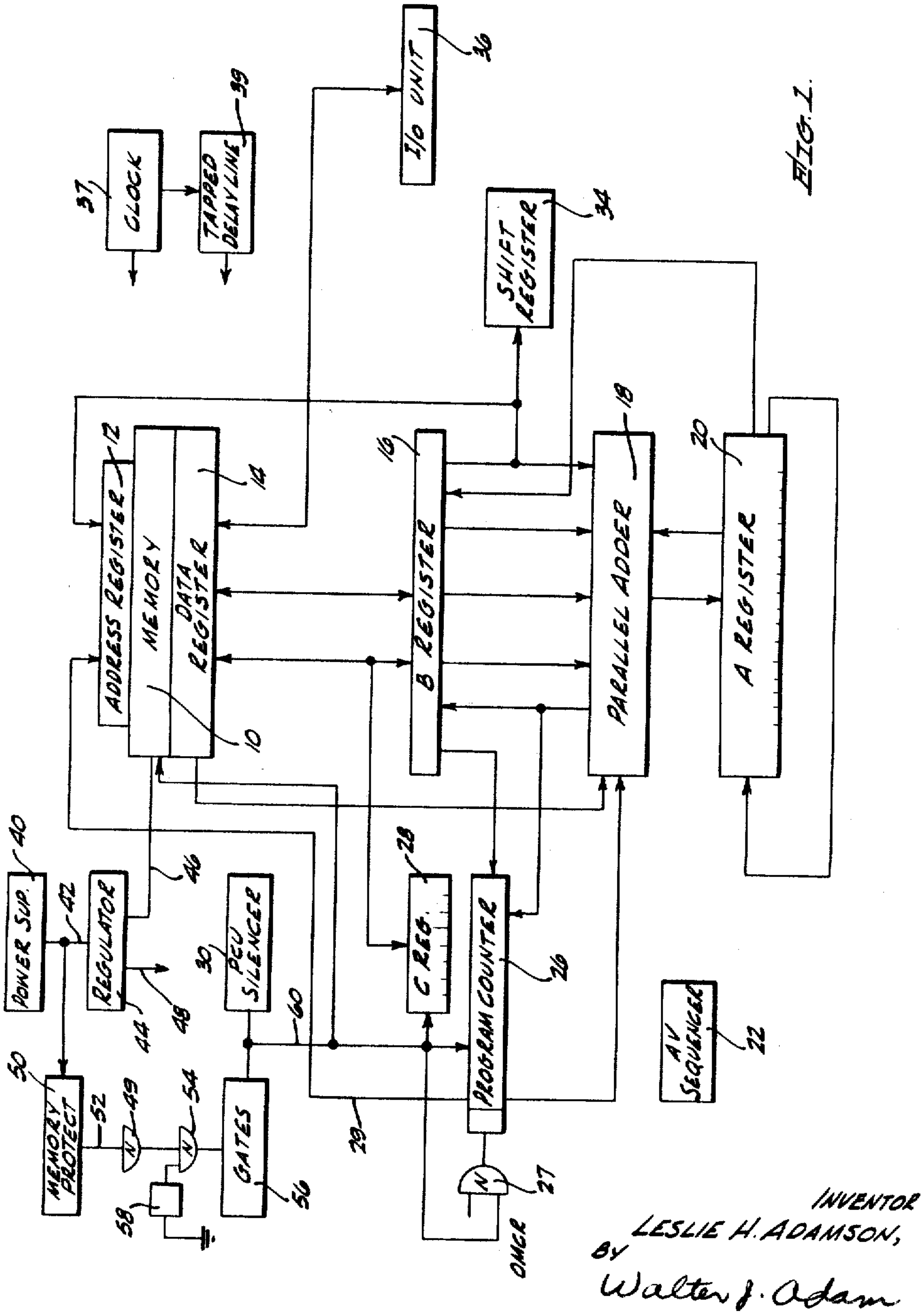
FIG. 1 is a schematic block and circuit diagram showing the memory protection system in accordance with the principles of the invention utilized in a digital computer system.

Referring first to FIG. 1, a computer in which the system in accordance with this invention may be utilized, includes a memory system 10 which may be a magnetic memory storing information in magnetic cores, thin films, magnetic wires or other suitable storage arrangements. Applicable to the principles of the invention are any type of memory which, for reliable operation, requires that currents or voltages utilized therein be within selected tolerances. As well known in the art, the memory 10 may have a plurality of cells or word positions at which either instruction words or data words are stored. An address register 12 temporarily stores and applies binary addresses to the memory 10 and a data register 14 temporarily stores binary information which is either read from or to be stored in the memory 10. The system may include a buffer or B register 16, an adder 18 which may be a parallel adder for example, and an accumulator or A register 20. An AU or arithmetic unit sequencer 22 may be associated with the arithmetic unit which principally includes the registers 16 and 20 and the adder 18. The AU sequencer 22 develops timing or logical control signals for performing sequences of operation, as are well known in the art. The program control unit may include a program counter 26, a command or C register 28 and a PCU or program control unit sequencer 30. A shift register counter 34 may be provided to store a value which may be obtained from an instruction, to determine the number of iterations or operations to be performed. An input-output unit 36 may supply new data to the data register 14 or receive data therefrom. The system includes a clock 37 which in turn is coupled to a tapped delay line 39 for providing timing control during the intervals between clock pulses.

Power may be supplied to the computer system and the memory system from a power supply 40 which applies unregulated D.C. voltage through a lead 42 to a voltage regulator 44 and in turn through leads 46 and 48 to the memory and to registers and other elements of the system. It is to be noted that other regulations (FIG. 3) may be utilized to supply other voltage levels to the system.

A memory protection system 50 in accordance with the invention responds to the unregulated D.C. voltage on the lead 42 to inactivate the memory 10 upon anticipation of a voltage failure by the regulator 44. A signal is sent from the memory protect circuit 50 through a lead 52 to a gate 49 and to a gate 54 functioning as an "or" gate which energizes further master clear gates 56. As is well known in the art, a conventional computer is manually cleared during start up. A manual master clear switch 58 applies a master clear signal to the "OR" gate 54. In one arrangement in accordance with the invention, the master clear circuit 56 applies signals through a lead 60 to reset the program counter 26 to the 000 state representing a fixed starting address in the memory 10. A NAND gate such as 27 is coupled to the control input of each flip flop as will be explained relative to FIG. 10, to reset all flip flops of the program counter 26 in response to an inverted master clear signal OMCR. Also in accordance with the principles of the invention, the program counter 26 may be set to any desired start address by an appropriate gating circuit. Also, the command register 28 may be reset to a 0 state so that operation thereby is prevented during a failure condition. The PCU sequencer 30 may also be set to an illegal state such as all "ones" representative of a condition required to restart operation but which does not develop any computer control signals as will be explained subsequently. A memory control flip flop E05 (FIG. 3) is also reset by the master clear signal on the lead 60.

As is well known in the art, the computer system of FIG. 1 operates by deriving instructions from the memory 10 at the address retained in the program counter 26 in response to control signals developed by the PCU sequencer 30. The address is applied from the program counter 26 to the address register 12 through a composite lead 29. The instruction word is transferred from the data register into the B and C registers with the operating code being transferred to the C register 28 and an address of an operand being transferred to the B register 16. Certain bits of the instruction word may form the operating code and certain bits may form the operand address, as is well known in the art. The operand address is then transferred from the B register to the address register 12 and an operand or data word is then transferred to the B register 16 in response to the PCU sequencer 30 responding to the contents of the C register 28. The function of the program counter 26 is to retain the address of the next instruction to be accessed so the contents thereof are incremented by one, such as being passed through the adder 18 after each instruction is accessed. The PCU sequencer develops control signals properly sequenced and timed with the clock 37 to perform the accessing of an instruction and the accessing of an operand from memory, as well as to control other computer operations. As is well known in the art, each of the storage and control registers includes flip flops with proper gating to respond to binary information signals and to control signals.

The next operation in the execution of the instruction such as an arithmetic instruction is to perform an arithmetic operation on the operand in the B register 16 under control of the AU sequencer 22. The instruction code stored in the C register 28 may control the AU sequencer 22. The partial result may be stored in the A register 20 while the next instruction is derived from memory in response to the address in the program counter 26. A transfer instruction when derived from memory, commands the computer to take an operand from a memory location specified by the address in the transfer instruction word, the operand including an address which is transferred to the program counter. In the system in accordance with the principles of the invention, a transfer instruction may be stored in a predetermined memory location such as 000 as a start routine for transferring the computer operation to a start point in the program when a voltage failure condition has been removed. The starting point in the program may be provided by the address to which the transfer instruction causes the computer to resume operation. It is to be noted that the predetermined address which the computer first accesses in response to the program control unit may contain instructions other than transfer instructions in accordance with the principles of the invention. Operation and arrangement of a type of digital computer as shown in FIG. 1 to access instructions from the program stored in memory and then execute the instruction are well known in the art and will not be explained in further detail.

Figures 2, 8:
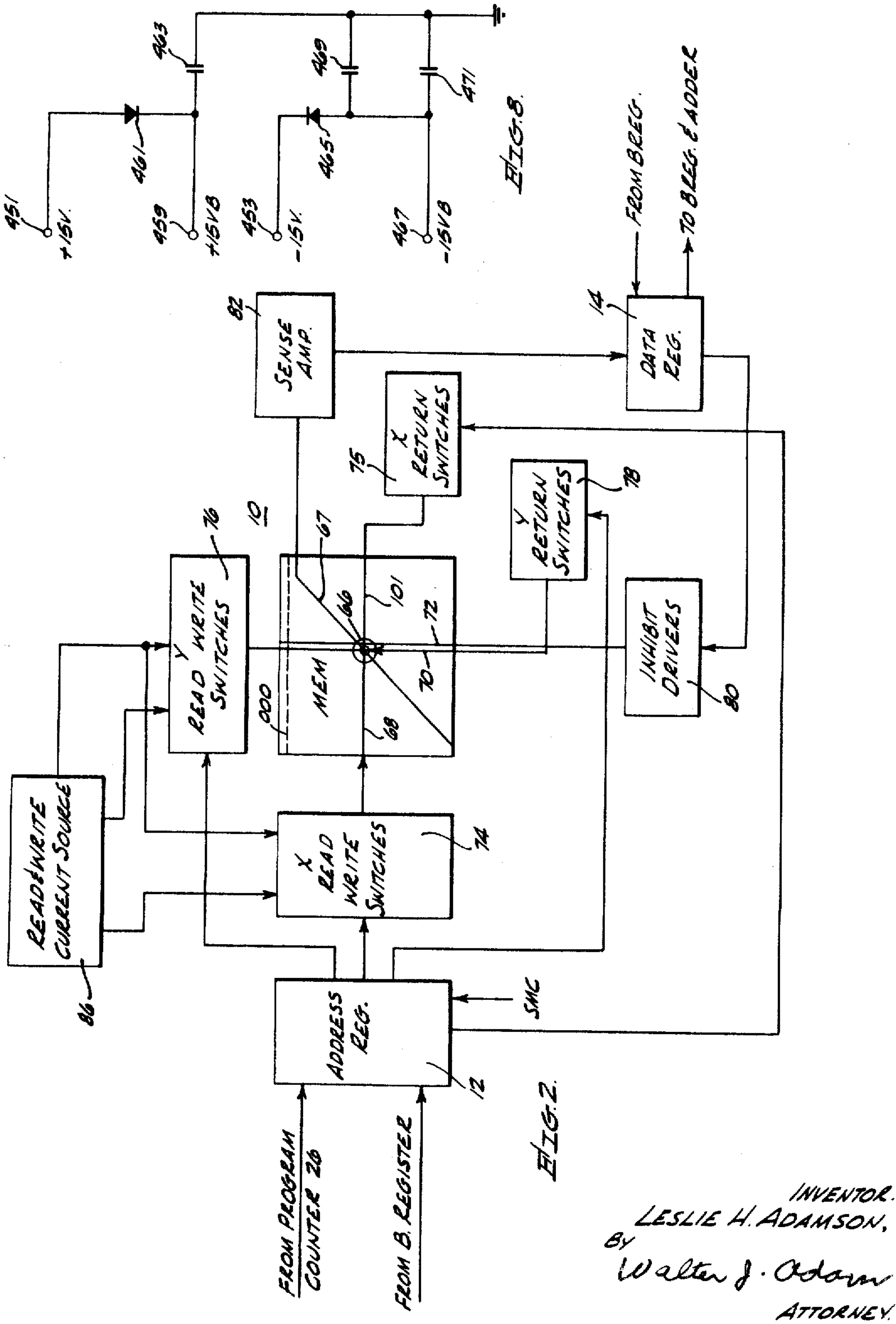
FIG. 2 is a schematic block diagram showing the memory system utilized in the computer of FIG. 1.
FIG. 8 is a schematic circuit diagram of a power supply circuit to be utilized with the inhibiting portion of the memory protection system.

Referring now to FIG. 2, a typical or conventional arrangement of the memory system 10 will be explained in further detail. A memory bank 64 may include rows and columns of cores arranged in respective X and Y directions, with each row including a plurality of cores such as 66 arranged in rows representing a word position such as octal address 101. An octal address 000 may store a transfer instruction, for example, to start the computer in an appropriate subroutine upon removal of a power failure condition. For selection in the X direction, a plurality of X drive lines such as 68 are provided and for selection in the Y direction, a plurality of Y drive lines such as 70 are provided. Also, a plurality of inhibit lines such as 72 are provided, each passing through a bit position of common binary significance in all word positions. A plurality of sense lines such as 67 are also provided with each sense line coupled in common to the cores at the corresponding bit position of each word position. Selection of X and Y drive lines is provided respectively by X read-write switching circuit 74 and an X return switching circuit 75 and by a Y read-write switching circuit 76 and a Y return switching circuit 78. The address register 12 applies signals representative of an addressed word to the X and Y switching circuits 74 and to the X and Y return switches 75 and 78. As is well known in the art, the X and Y drive lines are connected in groups at both ends so that a minimum of decoding gates are required to select all cores of an addressed word position. Switching or decoding circuits for providing a current path through one of a plurality of drive lines are well known in the art and will not be explained in further detail.

An inhibit driver circuit 80 responds to information signals in the data register 14 during writing to inhibit the writing of a "one," for example. A sense amplifier circuit 82 responds to sensed signals at times determined by strobe pulses to apply interrogated information signals to the data register 14. The system may operate during reading by interrogating the presence of a stored "one" state and during writing by switching all cores to a "one" state except those that are inhibited by a half amplitude current pulse to write a "zero." A read and write current source 86 applies half amplitude current pulses to the X and Y read-write switching circuits 74 and 76 at proper times during each read-write cycle to pass through the controlled switches of the circuits 74 and 76. Although the system of FIG. 1 has been explained as a coincident current selection system, the principles of the invention are applicable to other selection systems such as linear selection of each word position.

Figure 3:
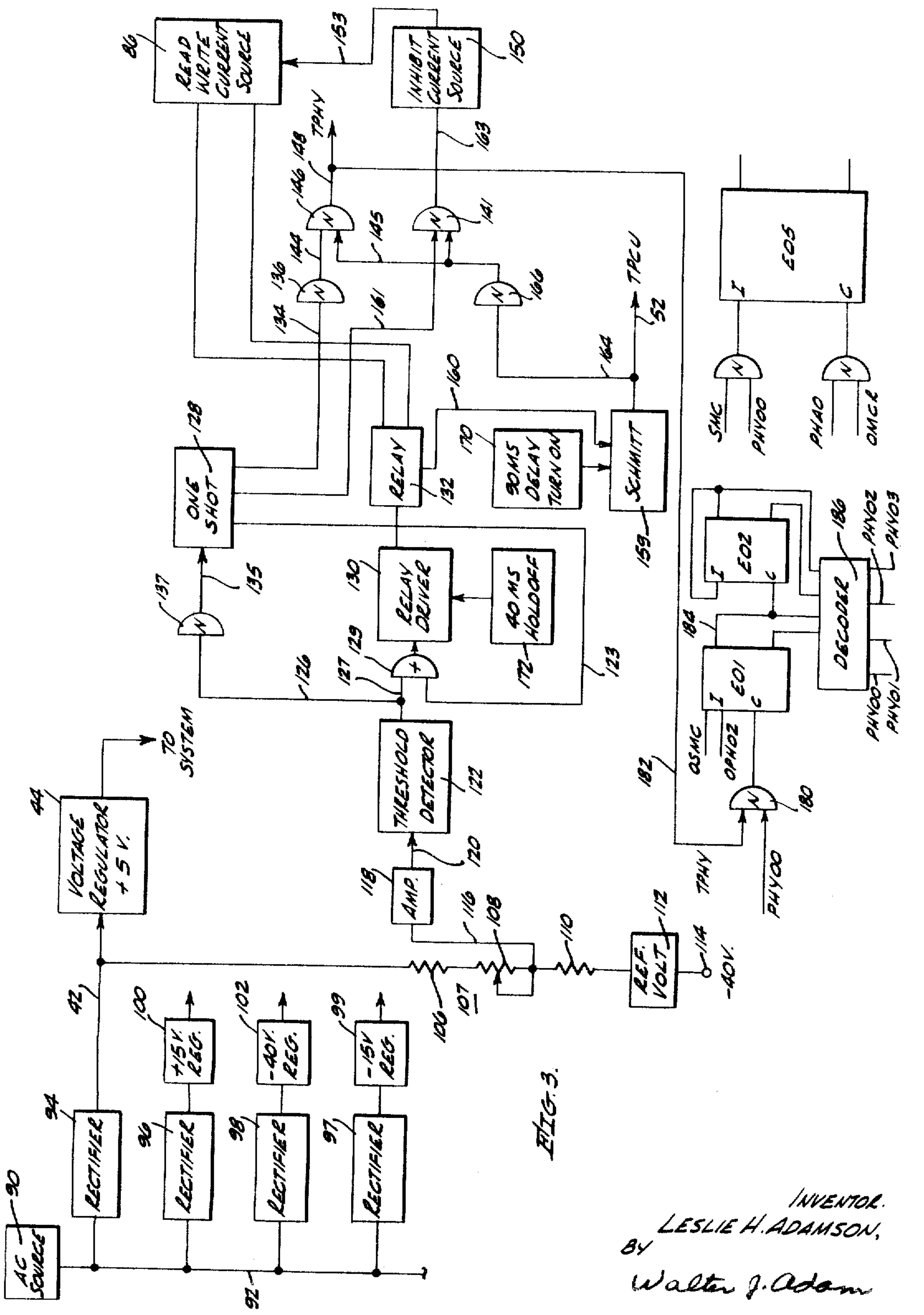
FIG. 3 is a schematic block diagram of the memory protection system shown in FIG. 1.

Referring now to FIG. 3, the memory protection system 50 of FIG. 1 will be explained in further detail. Power is supplied to the system from an A.C. source 90 providing line voltages which may be subject to failures and fluctuations or transients, as is well known in the art. The A.C. signals are applied on a plurality of leads 92 to transformer and rectifier circuits such as 94, 96, 98 and 97 which develop rectified or unregulated voltages at selected levels such as respective +5 volts, +15 volts, −40 volts and −15 volts. The rectifier 94 applies unregulated D.C. voltage through the lead 42 to the +5 volt regulator 44. Similarly, the rectifier circuits 96, 98 and 97, respectively, apply unregulated D.C. voltages to a +15 volt regulator 100, a −40 volt regulator 102 and a −15 volt regulator 99. It is to be understood that voltage regulators other than those shown may be utilized to supply those voltage levels required in the various gates, flip flops, memory elements and other circuits utilized in the computer system. In accordance with the invention the unregulated voltage is sensed on the lead 42 which represents the most heavily loaded voltage source as the illustrated computer operates with a true logical level of +5 volts and a false logical level of ground. The +5 voltage regulator, as well as the regulators 100, 102 and 99 supply power to the various portions of the computer system, including the memory system. Thus, power failure for the entire system is sensed from a single unregulated voltage.

The voltage on the lead 42 is applied through resistors 106, 108 and 110 of a voltage comparator network 107 to a source of reference voltage 112 which in turn is coupled to a suitable source of reference potential such as a −40 volt terminal 114. The resistor 108 is an adjustable type to vary the amount of voltage change or fall on the lead 42 that anticipates the response of the regulator 44 to operate out of tolerance, as a result of the inability of the regulator to maintain an in-tolerance voltage. The signal sensed between the resistors 108 and 110 which is a difference voltage between the unregulated voltage source on the lead 42 which may be nominally +12.5 volts and the reference voltage developed by the source 112 is applied through a lead 116 to an amplifier 118 and in turn through a lead 120 to a threshold detector 122.

In response to the voltage being out of tolerance, a positive signal is applied through a lead 127 and an "OR" gate 129 to a relay driver 30. Also, a signal is sent through a lead 126, and a NAND gate 137 functioning as an inverter and a lead 135 to a single or one-shot circuit 128 which produces a pulse approximately 7.5 milliseconds in width, for example. The one-shot circuit 128 applies a signal through a lead 134 and through a gate 136, a lead 144 and a gate 146 to a lead 148 as a TPHY signal to indicate a fault condition to the memory phase counters including flip flops E01 and E02. Also a signal is applied from the one-shot circuit 128 through a lead 123 to the "OR" gate 129 and to the relay driver 130 which maintains the relay 132 turned off or de-energized to remove the +40 and −40 volts supplied to the read-write current source 86. A false signal is applied from the one-shot circuit 128 through a lead 161 to a gate 141 to initiate an inhibit function which is applied through a lead 163 to a current inhibiting circuit 150 for inhibiting the read-write current sources 86 through a lead 153. The read-write current source 86 is inhibited to allow the capacitor elements therein to discharge after the supply voltages are removed therefrom.

A second false term is also applied to the gate 141 in response to a Schmitt trigger circuit 159 being triggered through a lead 160 when the relay 132 is de-energized, the relay characteristically requiring a relatively long time to respond. The Schmitt trigger circuit 159 applies a signal through a lead 164, a gate 166 and a lead 145 to the gate 146, functioning as an "OR"

gate to maintain the signal TPHY at a positive level. The term on the lead 145 is also applied to the gate 141 while the signal developed by the one-shot circuit 128 is still present to insure that the read-write current source 86 is inhibited without interruption until capacitor elements therein are completely discharged. A time delay circuit 170 is coupled to the Schmitt trigger circuit 159 to prevent the system from being turned on after the relay 132 is energized until a delay time of 90 milliseconds, for example, thus allowing all system voltages to return to regulated values. Also, a time delay or hold-off circuit 172 is coupled to the relay driver circuit 130 to prevent it from being again energized for a minimum time of 40 milliseconds, for example, after the system is deenergized.

The Schmitt trigger circuit 159 also applies a TPCU signal through the lead 52 to the gates 49, 54 and 56 as shown in FIG. 1 which in turn apply a MCR or master clear signal through the lead 60 to the PCU sequencer 30, the C register 28, the program counter 26 and the memory 10, for example. The phase counter flip flops E01 and E02 operate during memory read-write operation to develop four timing signals PHY00, PHY01, PHY02 and PHY03 for control of the memory operation.

Upon occurrence of a voltage failure condition, the system in accordance with the invention allows any presently operating memory cycle to be completed. Thus a word of information which has been read and is presently stored in the data register to be rewritten into the memory during the last two phases of the cycle is rewritten before the memory operation is terminated. Also, if the memory operation were terminated during the occurrence of reading or writing, the addressed cores may be left in unknown states, or in all zero states, for example. Thus a gate 180 functioning as an "OR" gate receives a TPHY signal on a lead 182. As will be explained relative to FIG. 9, the gates such as the gate 180 are "NAND" gates which provide a false output signal when all input signals are true and a true output signal when any of the input signals is false. Thus the gate 180 operates as an "OR" gate so that the output is true when TPHY goes true and PH00 is false and the output goes false when the PH00 signal goes true. The flip flops such as E01 and E02 which will be explained subsequently relative to FIG. 10, have a control input C and a plurality of information inputs I. The flip flops are triggered in response to a clock signal and the control input going true to a state determined by the information inputs. If one of the information inputs is false, the flip flop is triggered to a "one" state and if all inputs are true, the flip flop is triggered to the false state. Thus the flip flop E01 is locked at PHY00 time when TPHY is true as the control input signal is false and remains locked in that condition until TPHY goes false after removal of the undesirable voltage condition.

To explain the operation of the memory phase counter in which E01 forms the least significant bit, both flip flops are initially in the 00 or reset states and it is assumed that the control input to the flip flop E01 is true. In response to the first clock pulse and a start memory cycle signal or SMC signal true, the flip flop E01 is set to the true state as OSMC is false and the counter is thus changed to the 01 or PHY01 state. In response to the next clock pulse, the flip flop E02 is set in response to its own false output signal because the control signal on a lead 184 is true from the flip flops E01. Also the flip flop E01 is reset as SMC is false resulting in the counter changing to the 10 or PHY02 state. At the next clock time the flip flop E01 goes true because the PH02 signal is true resulting in the counter changing to the 11 or PHY03 state. At the next clock time both flip flops go to the false or 00 states.

A conventional decoding network 186 responds to the output signals from the true and false sides of the flip flops E01 and E02 to develop the phase timing signals as shown by the following relations:

PHY00=OE01 OE01
PHY01=E01 OE02
PHY02=OE01 E02
PHY03=E01 E02

A flip flop E05 which synchronizes the memory phase counter or flip flop E01 and E02 with the flip flops X01 and X02 (FIG. 11) of the PCU sequencer 30 receives a signal OMCR and OPHA0 at its control input terminal to be set and reset when MCR is false. Signals SMC and PHY00 are applied through a NAND gate 187 to the informational input terminal of the flip flop E05.

Figure 4:
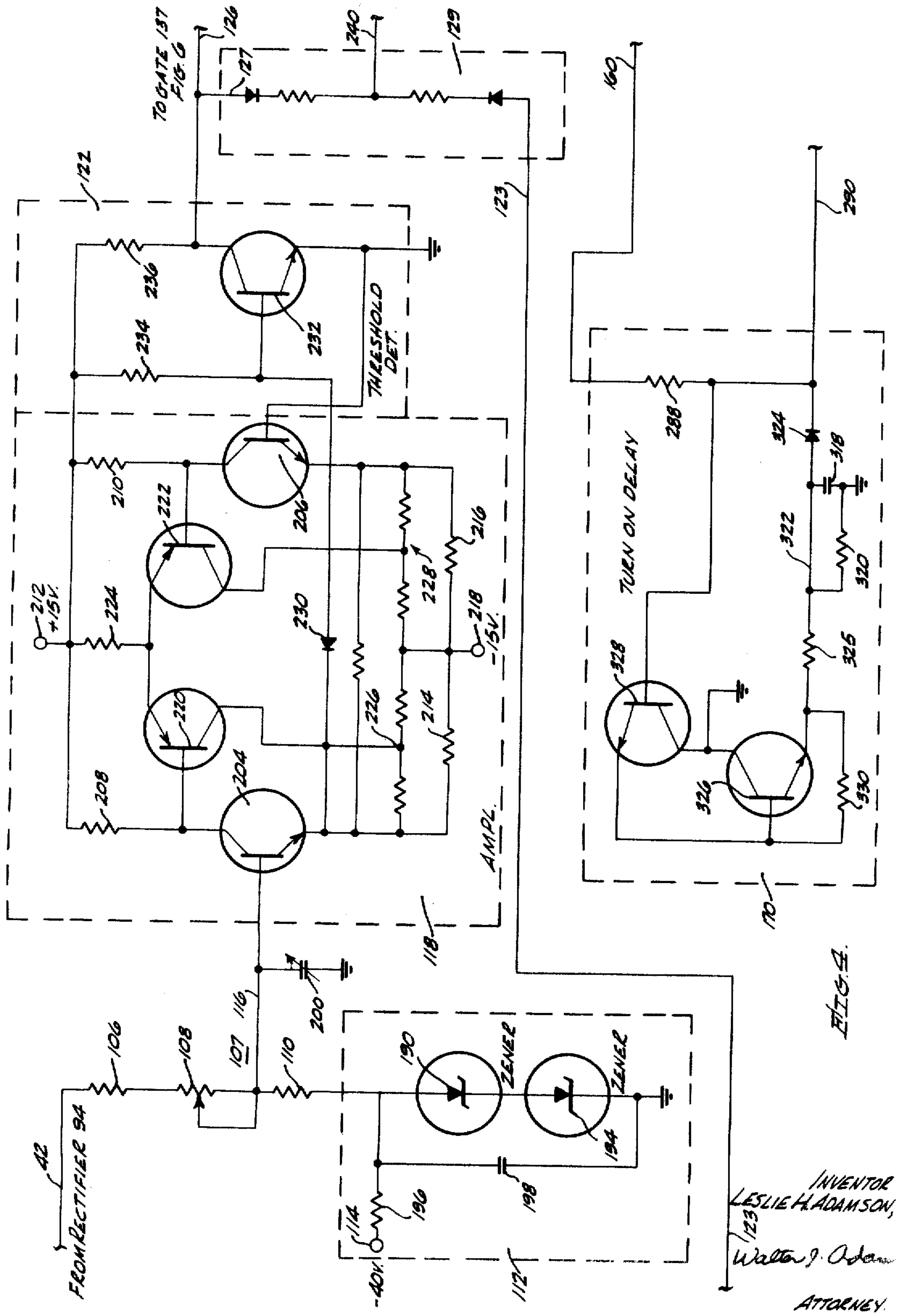
FIG. 4 is a schematic circuit diagram of a first portion of the memory protection system of FIG. 3.
Figure 5:
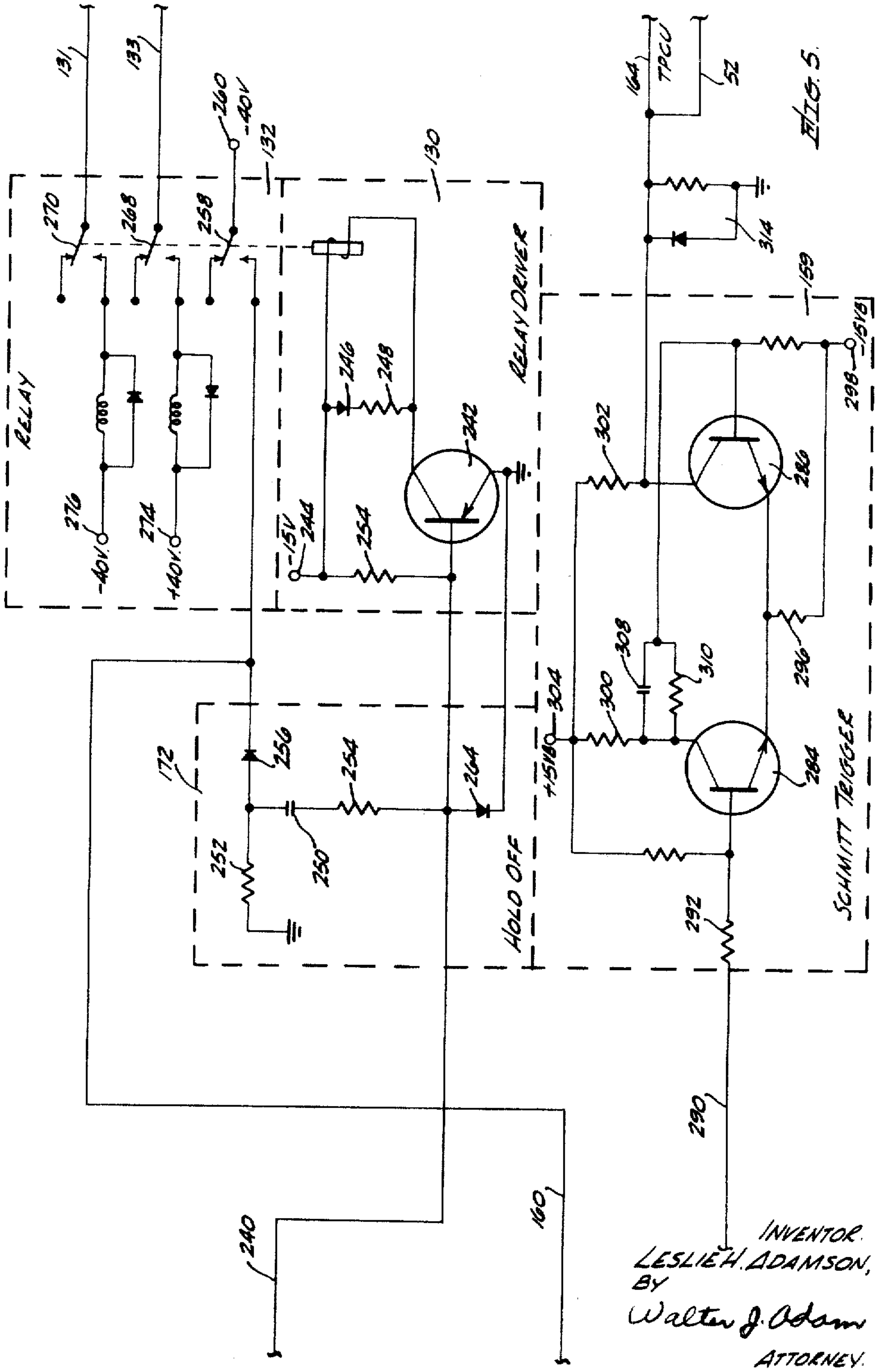
FIG. 5 is a schematic circuit diagram of a second portion of the memory protection system of FIG. 3.

Referring now principally to the circuit diagrams of FIGS. 4, 5 and 6, the memory protection system will be explained in further detail. The voltage divider 107 is coupled through the anode to cathode paths of zener diodes 190 and 194 to ground with the anode of the diode 190 coupled both through a resistor 196 to the −40 volt terminal 114 and through a storage capacitor 198 to ground for providing a continuing reference voltage in the reference voltage source 112 during a fall of the unregulated line voltage. A minimum pulse width capacitor 200 which may be variable is coupled between the lead 116 and ground to insure that a voltage transient does not trigger the threshold detector when it has a duration of less than a minimum time of 5 microseconds, for example. The valve of the capacitor 200 is selected to provide a charge time during which the voltages developed by the regulators is not changed sufficiently to affect the memory operation.

The amplifier 118 includes npn type transistors 204 and 206 having collectors coupled through respective resistors 208 and 210 to a +15 volt terminal 212 and having emitters coupled through respective resistors 214 and 216 to a −15 volt terminal 218. The bases of the transistors 204 and 206 are respectively coupled to the lead 116 and ground to provide a differential operation. Also arranged in a differential configuration are pnp type transistors 220 and 222 having emitters coupled through a resistor 224 to the terminal 212 and having collectors coupled to respective divider circuits 226 and 228 which in turn are respectively coupled between the emitter of the transistor 204 and the terminal 218 and between the emitter of the transistor 206 and the terminal 218.

The amplified signal is applied from the collector of the transistor 220 through the cathode to anode path of a diode 230 and through the lead 120 to the base of an npn type transistor 232 of the threshold detector 122. When the sensed voltage is in tolerance, the transistors 204 and 220 are conducting sufficiently to back bias the diode 230 and when a low or falling voltage is applied to the base of the transistor 204, the diode 230 is forward biased and a negative voltage is applied to the base of the transistor 232 to bias that transistor out of condition. The transistor 232 is biased in a saturated condition when the sensed voltage is in tolerance and is biased out of conduction when the sensed voltage is out of tolerance to apply a voltage on the lead 126 of approximately +12 volts, for example. The base and collector of the transistor 232 are coupled through respective resistors 234 and 236 to the +15 volt terminal 212 and the emitter is coupled to ground. The signal on the lead 127 is applied through the "OR" gate 129 and through a lead 240 to the base of a pnp type transistor 242 of the relay driver 130. It is to be noted that although the "OR" gate 129 is of the type shown, other gates shown throughout the illustrated system are NAND gates of the type shown in FIG. 9. The emitter of the transistor 242 is coupled to ground and the collector is coupled through the coil of the relay 132 to a −15 volt terminal 244. A path of relay discharge current is provided from the terminal 244 through the anode to cathode path of a diode 246 and in turn through a resistor 248 to the collector of the transistor 242. A biasing resistor 254 is coupled between the base of the transistor 242 and the terminal 244.

Figure 7:
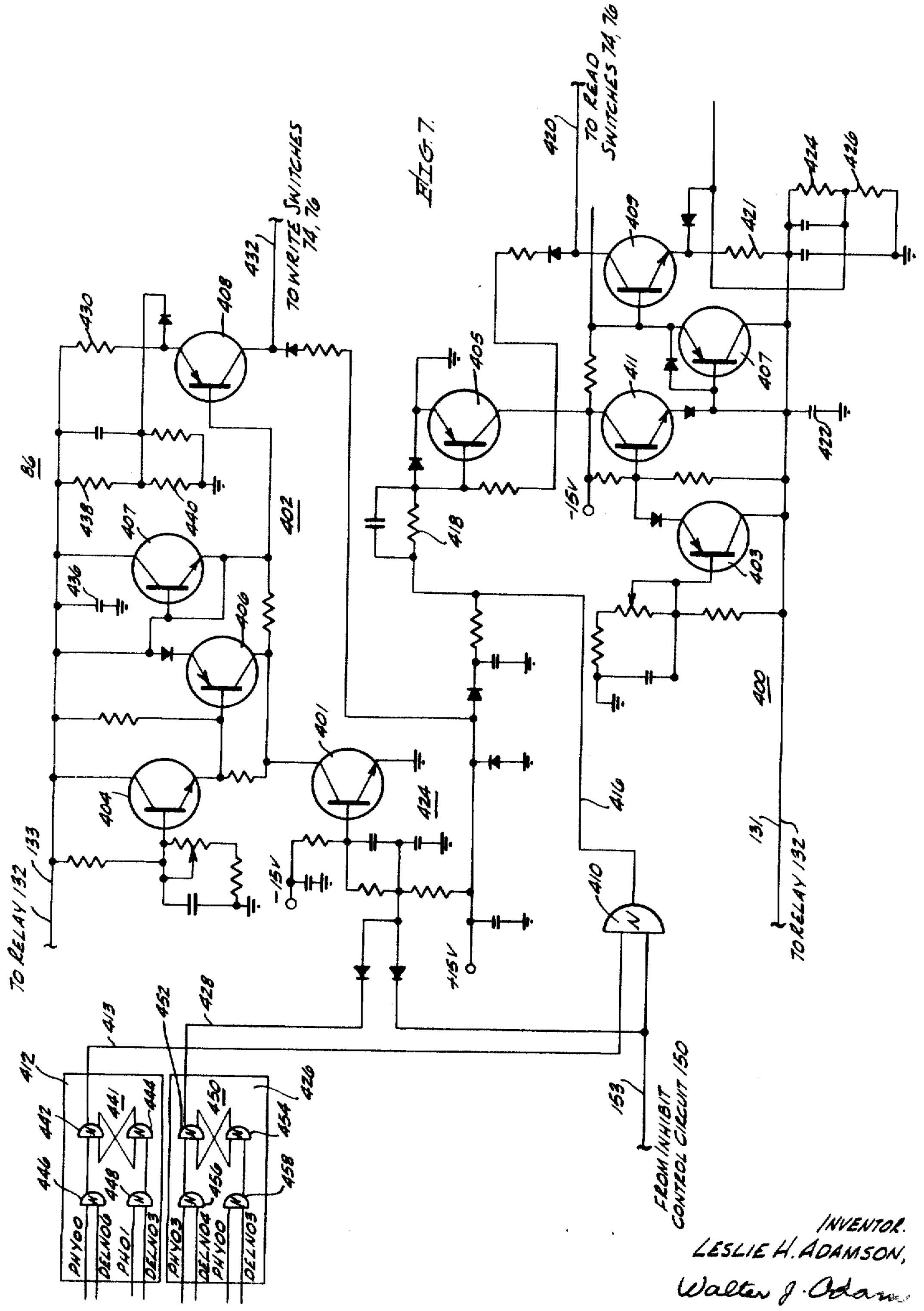
FIG. 7 is a schematic circuit diagram of a read-write current source that may be utilized in the memory systems of FIGS. 1, 2 and 3.

The delay circuit 172 which prevents the relay from being energized for a minimum of 40 milliseconds, for example, after being energized includes a capacitor 250 having one end coupled through a resistor 252 to ground and the other end coupled through a resistor 254 to the lead 240. The capacitor 250 is also coupled through the anode to cathode path of a diode 256 to a contact 258 of the relay 132, the contact also being coupled to a −40 volt terminal 260. When the relay 132 is energized to start normal memory operation, the contact 258, which is shown in the unenergized position, charges the capacitor 250 from the −40 volt terminal 260 without affecting the energized relay driver 130. When the relay is de-energized to the position shown, a discharge path is provided for the capacitor 250 through the resistor 252, the capacitor 250, the resistor 254 and a diode 264 to ground to provide a period of 40 milliseconds during which the relay driver 130 is maintained in a nonconductive or de-energized state by a positive voltage at the base of the transistor 242. It is to be noted that during system turn-on, the capacitor 250 is previously discharged so that no delay is provided at that time by the circuit 172. The relay 132 also includes contacts 268 and 270 which connect a +40 volt terminal 274 and a −40 volt terminal 276 to respective leads 133 and 131 when the relay is energized. The leads 131 and 133 supply power to the respective read and write current sources of the current source 150 (FIG. 7).

The Schmitt trigger circuit 159 which during a failure condition is triggered through the lead 160 in response to the relay 132 being de-energized to develop a signal TPCU and which during turn-on of the memory system, is reset at the end of a predetermined period after the relay 132 is energized, as determined by the turn-on delay circuit 170, includes npn type transistors 284 and 286. The lead 160 is coupled through a timing resistor 288 to a lead 290 which in turn is coupled through a resistor 292 to the base of the transistor 284. The emitters of the transistors 284 and 286 are coupled through a resistor 296 to a −15 volt terminal 298 and the collectors of the transistors 284 and 286 are coupled through respective resistors 300 and 302 to a +15 volt terminal 304. Suitable biasing resistors are coupled to the bases of the transistors 284 and 286. It is to be noted that the voltage at the terminals 298 and 304 are maintained B voltages as will be explained subsequently relative to FIG. 8.

To provide the triggering operation after the relay is de-energized and bias the transistors 284 and 286 respectively into and out of conduction, a capacitor 308 and a resistor 310 are both coupled between the collector of the transistor 284 and the base of the transistor 286. The lead 164 is coupled to the collector of the transistor 286 and is coupled to a clamping circuit 314 to maintain the voltage on the lead 164 at near ground level in the false state and near +5 volts in the true state.

When the relay 132 is energized, the delay circuit 170 provides a 90 millisecond delay before the Schmitt trigger changes state and removes the inhibit signal from the gate 141 and the inhibit source 150. A capacitor 318 and a resistor 320 are coupled between a lead 322 and ground with the lead 322 coupled through the anode to cathode path of a diode 324 to the lead 290. The capacitor 318 must be charged by the −40 volts of the terminal 260 to approximately −13 volts, for example, before the transistor 284 is biased out of conduction and the signal on the lead 164 falls to ground. To provide a fast discharge of the capacitor 318 when the relay 132 is de-energized, the lead 322 is coupled through a resistor 325 to the emitter of a transistor 326 which in turn has a base coupled to the emitter of a transistor 328. The collectors of the transistors 326 and 328 are coupled to ground and the base and emitter of the transistor 326 are intercoupled through a resistor 330. The base of the transistor 328 is coupled to the lead 290 for being biased into conduction when the relay is de-energized so that current is rapidly supplied through the limiting resistor 325 to discharge the capacitor 318. During this discharge operation when the relay is de-energized, the diode 324 isolates the timing circuit from the trigger circuit 159.

Figure 6:
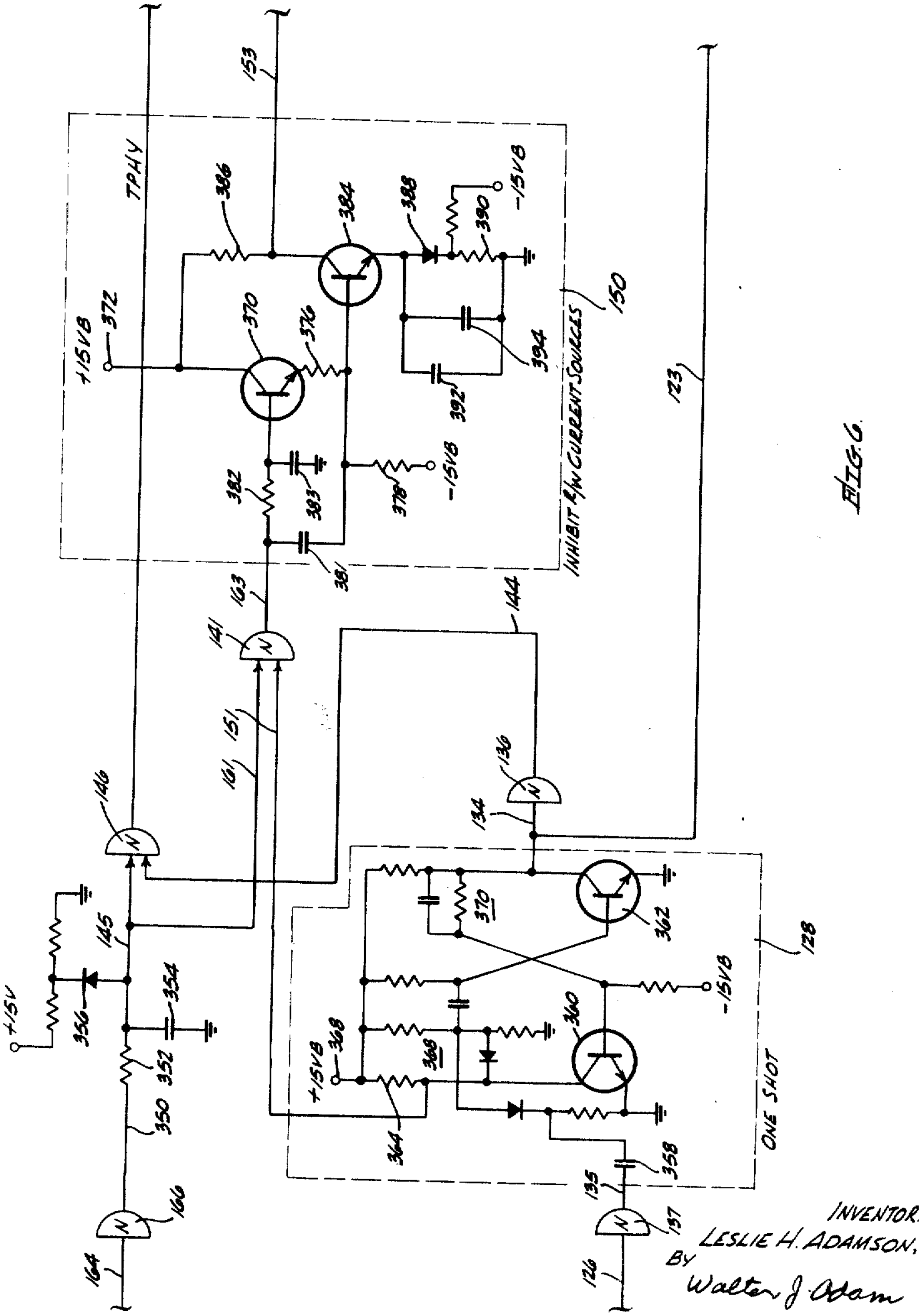
FIG. 6 is a schematic circuit diagram of a third portion of the memory protection system of FIG. 3.

Referring now principally to FIG. 6, the signal from the Schmitt trigger 159 is applied from the lead 164 through the NAND gate 166, functioning principally as an inverter, to a lead 350 and through a resistor 352 and a lead 145 to the NAND gate 146 functioning as an "OR" gate. The lead 145 is coupled through a capacitor 354 to ground to provide a two microsecond delay of the TPHY signal when the Schmitt trigger circuit 159 is de-energized during a system turn-on operation after correction of an undesirable line voltage transient. Also, the lead 145 is coupled to a +5 volt clamping circuit 356. The signal developed by the NAND gate 146 is applied through the lead 148 as the TPHY signal to the phase counter gates of FIG. 3.

A second input signal to the gate 146 is derived from the one-shot circuit 128 responding to a signal on the lead 126 applied through the NAND gate 137 and through the lead 135 to a coupling capacitor 358. The circuit 128 includes npn type transistors 360 and 362 having emitters coupled to ground and collectors coupled through respective resistors 364 and 366 to a +15 volt terminal 368. The base of the transistor 360 is coupled to the resistor 366 through a suitable control network 370 and the base of the transistor 362 is coupled to the resistor 364 through a suitable control network 368. In response to a negative pulse applied to a lead 135 after the inversion in the gate 137, the transistor 360 is biased into conduction and the transistor 362 is biased out of conduction for a period which may be 7.5 microseconds, for example, to apply a positive pulse to the lead 134. The signal on the lead 134 after inversion in the gate 136 is applied through the lead 144 to the gate 146 to initiate the signal TPHY.

The signal developed by the trigger circuit 159 on the lead 145 is also applied through the lead 161 and the gate 141 to the inhibit current source circuit 150 which includes an npn type transistor 370 having a collector coupled to a +15 volt terminal 372, an emitter coupled through resistors 376 and 378 to a −15 volt terminal 380 and a base coupled through a resistor 382 to the lead 163. A signal is also applied from the one-shot circuit 128 through the lead 151 to the gate 141 for initially inhibiting the current source. The base of the transistor 370 is coupled to ground through a capacitor 383 which with the resistor 282 provides a 2 microsecond delay when a failure condition has been sensed to allow a current memory cycle to be terminated before the memory current source is inhibited. An npn type transistor 384 has a base coupled to a point between the resistors 376 and 378, a collector coupled through a resistor 386 to the terminal 372 and an emitter coupled through the anode to cathode path of a decoupling diode 388 and a resistor 390 to ground for supplying a constant voltage reference to the emitter thereof. Also coupled between ground and the emitter of transistor 384 are storage capacitors 392 and 394 for accepting current without permitting a significant voltage change during a system turn-off operation. The collector of the transistor 384 is coupled to the lead 153 to apply an inhibiting signal to the read-write current source 86 (FIG. 3). The +15 and −15 voltages in the inhibit control source 150 are special B voltages as developed by the circuit of FIG. 8.

Referring now to FIG. 7, the read-write current source 86 of FIG. 3 that may be utilized in the system in accordance with the invention includes a read control circuit 400 and a write control circuit 402. Included in the read circuit 400 are pnp type transistors 403, 405 and 407 and npn type transistors 409 and 411. The write circuit 402 includes pnp type transistors 406 and 408 and npn type transistors 401, 404 and 407. The read-write current source inhibit signal is applied from the lead 153 to a NAND gate 410 in combination with a timing pulse applied through a lead 413 from a read time flip flop circuit 412. The inhibit signal on the lead 153 is normally positive or true so that upon the occurrence of the timing pulse, a negative signal is applied through a lead 416 to the base of the transistor 405 to bias that transistor into conduction.

The NAND gate 410 as will be explained relative to FIG. 9 develops a negative output signal when the two input signals are true and develops a positive output signal when any or all of the input signals are false. Thus, when a negative signal is applied to the lead 153, a true signal is maintained on the lead 416 so that the transistor 405 is maintained in its non-conductive state. When the transistor 405 is biased into conduction, the transistor 411, 403, 407 and 409 are biased into conduction to pass a current pulse through the read switches of circuits 74 and 76 of FIG. 2 and through a lead 420 to a resistor 421, the lead 131 and through the relay 132 to the −40 volt terminal 276 (FIG. 5). Included in the circuit 400 is a filter capacitor 422 coupled between the lead 131 and ground. During turn-off of the relay, the capacitor 422 discharges from the lead 131 through resistors 424 and 426 to ground. It is to be noted that conventional current sources require a capacitance to overcome circuit lead inductances.

The write current source 402 includes a NAND gate 424 responsive to a write timing flip flop circuit 426 applying a timing signal through a lead 428 and responsive to an inhibit signal on the lead 153. The NAND gate 424 which includes the transistor 401 is shown in detail because the configuration varies from that of FIG. 9. The +40 volt is applied from the relay 132 through the lead 133 and a resistor 430 to the emitter of the transistor 408. Upon a coincidence of the timing signal and a normally positive inhibit signal, a current pulse flows from the lead 133 through the transistor 408 and through a lead 432 to the read-write switches 74 and 76 of FIG. 2. Each of the transistors 404, 406, 407 and 408 are normally nonconductive, being biased into conduction upon a coincidence of the timing signal and the absence of a negative inhibit signal. A filter capacitor 436 is coupled between the lead 133 and ground and resistors 438 and 440 are coupled between the lead 133 and ground. Thus, the voltages may be removed and the current source 86 may be positively inhibited by the gates 410 and 424 while the circuit capacitance is discharged so that currents are not supplied to the memory. The operation of the type of current source shown in FIG. 7 is well known in the art and will not be explained in further detail.

The read timing circuit 412 includes a toggle flip flop 441 formed of NAND gates 442 and 444 each having a first output terminal coupled to an input terminal of the other and each having an input terminal coupled to respective NAND gates 446 and 448. The output terminal of the gate 442 is also coupled to the lead 413. Each NAND gate 446 and 448 respectively responds to a PH00 and a PHY01 signal and to a proper delay line signal DEL N06 and DEL N03, the timing of which will be explained subsequently in further detail. Because each of the NAND gates 442 and 444 develops a false output signal only when both input signals are true, a coincidence of true input signals at the gate 446 applies a false signal to the gate 442 which in turn applies a true signal to the input terminal of gate 444. The signal developed by the gate 448 is true at that time so that the gate 444 is thus maintained with a false output signal. The gate 442 is maintained with a true output signal by the gate 444 when the output signal from the gate 446 goes to a true level so that a stable state is maintained until a coincidence of true signals at the gate 448 develops a false signal. Thus, the gate 442 develops a false signal to terminate the timing pulse on the lead 413 and the gate

442 is maintained with a false output signal to provide the second stable state. The write time flip flop circuit 426 which operates similar to the circuit 412, includes a toggle flip flop 450 having gates 452 and 454 in turn responsive to gates 456 and 458. The signals PHY03 and PHY00 in combination with the proper delay line signal DEL N03 and DEL N04 are applied to the respective gates 456 and 458. Thus the flip flop circuits 412 and 426 control the circuit source 86 to pass a read current pulse during read time and a write current pulse during write time.

Referring now to FIG. 8, a circuit is shown that develops a continuing B voltage for being utilized with the circuits controlling the inhibit function. These +15 and −15 volt sources are utilized in the Schmitt trigger circuit 159, the one-shot circuit 128, the inhibit control source 150 and the gates 137, 141 and 166. The +15 and −15 volt regulated voltages are applied from the voltage regulator 44 to respective terminals 451 and 453. A +15 volt B terminal 459 is coupled both through a diode 461 to the terminal 451 and through a capacitor 463 to ground. The −15 volt terminal 453 is coupled through a diode 465 to a −15 volt B terminal 467 as well as through capacitors 469 and 471 to ground. In operation, the voltage on the capacitor 463 is isolated from the +15 volts on terminal 451 when it falls in level and the charge stored on the capacitor 463 is adequate to maintain the +15 B voltage for a relatively long period thereafter. Similarly, the charge stored on the capacitors 469 and 471 requires a relatively long period to discharge when the voltage on the terminal 453 rises due to the decoupling effect of diode 465. This maintains the continuing −15 B voltage on the terminal 467 for a relatively long period. Thus, the system of the invention provides a voltage source sufficient to insure that the system inhibiting functions are performed during line voltage failure conditions.

Figure 9:
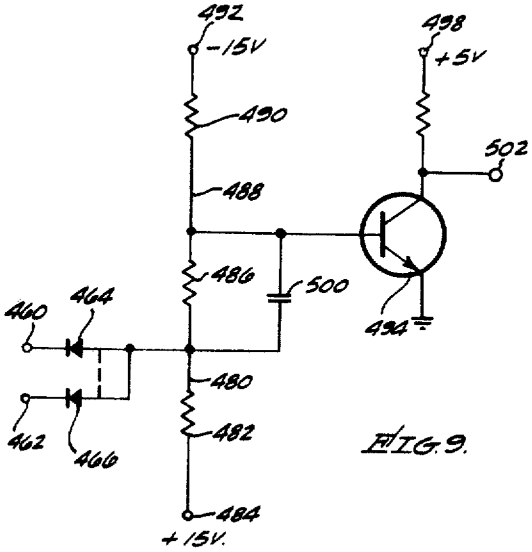
FIG. 9 is a circuit diagram of a NAND (negative and) gate that may be utilized in the system in accordance with the invention.

Referring now to FIG. 9 which shows a typical NAND gate that may be utilized in the system in accordance with the invention, a plurality of input terminals 460 and 462 are coupled through the cathode to anode paths of respective diodes 464 and 466 to a lead 480 which in turn is coupled through a resistor 482 to a +15 volt terminal 484. The lead 480 is also coupled through a resistor 486 to a lead 488 and through a resistor 490 to a −15 volt terminal 492. The lead 488 is coupled to the base of an npn type transistor 494 having an emitter coupled to ground and a collector coupled through a resistor 496 to a +5 volt terminal 498. A capacitor 500 may be coupled between the base of the transistor 494 and the lead 480 for reducing the rise time of the transistor when being biased into conduction. An output terminal 502 of the gate is coupled to the collector of the transistor 494. In operation, a false signal applied to either or both of the input terminals 460 and 462 cause current to flow from the terminal 484 through resistor 482 and through the corresponding diodes so that the transistor 494 is maintained in a non-conductive state and a +5 volt or true signal is provided on the terminal 502. When both of the input signals applied to the terminals 460 and 462 are true or +5 volts, the diodes 464 and 466 are biased out of conduction and a positive voltage is maintained at the base of the transistor 494 so that the transistor is biased into conduction. In this state approximately ground potential or a false signal level is applied to the terminal 502.

Figure 10:
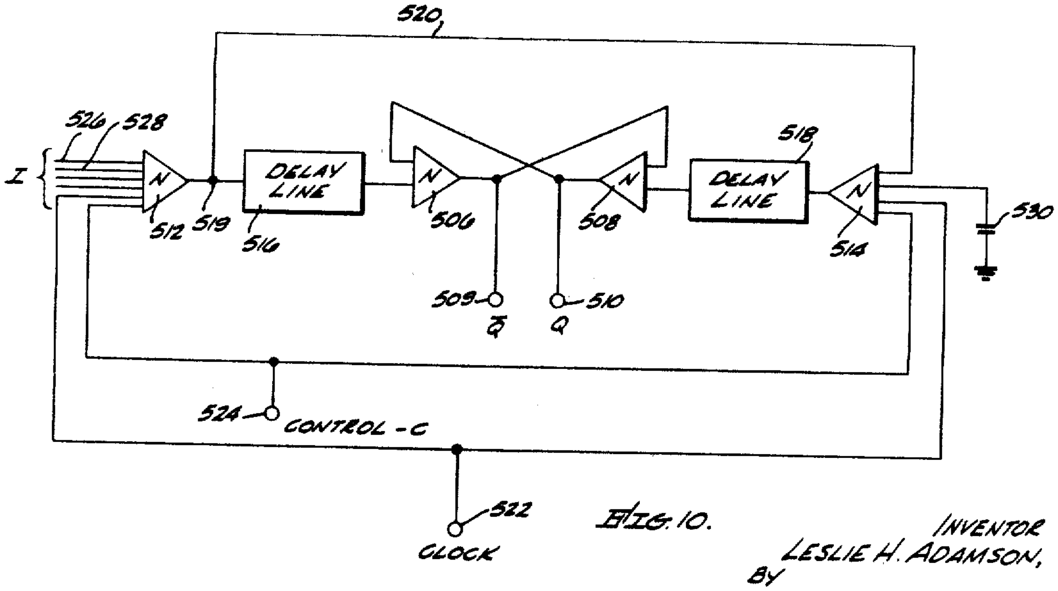
FIG. 10 is a schematic block diagram of a flip flop that may be utilized in the system in accordance with the invention.

Referring now to FIG. 10, which shows a flip-flop that may be utilized in the system of the invention, NAND gates 506 and 508 are provided with the output terminal of the gate 506 coupled to the false output terminal 509 as well as to the input terminal of gate 508 and with the output terminal of gate 508 coupled to a true output terminal 510 as well as to an input terminal of the gate 506. The toggle operation of the gates 506 and 508 is controlled by NAND gates 512 and 514 respectively coupled through delay lines 516 and 518 to to input terminals of respective NAND gates 506 and 508. The output terminal of the gate 512 is coupled through lead 519 and 520 to an input terminal of the gate 514. A source of clock pulses at a terminal 522 and a source of control pulses at a terminal 524 are also applied to the gates 512 and 514 which function as OR gates. The informational input is applied through leads such as 526 and 528 to the gate 512. For accommodating delays between the signal applied on the lead 520 and the clock and low informational signal, a capacitor 530 is coupled between ground and one input terminal of the gate 514.

In operation, the flip flop is utilized with the informational inputs on the leads 526 and 528 being normally true so that upon occurrence of the clock and control input signals, the signal on the lead 520 is false. The information input leads such as 526 and 528 are normally true in the absence of a coincidence condition at NAND gates (not shown) coupled thereto. The signal on the lead 519 is always true except at clock time when it becomes false to set the flip flop to the false state if all of the informational input signals are true and the control input signal is true. However, if one of the informational signals is false, at clock time, the signal on the lead 519 is true and the flip flop is set to the true state. For example, if the flip flop is in the false state with a high level signal at the terminal 509, the input signals to the gate 508 are both true so that a false signal at the terminal 510 is applied to the gate 506 along with the normally true signal on the lead 519. When one of the informational inputs on the leads such as 526 and 528 is false at clock time, the signal remains true on the lead 519. As a result, a false signal is developed by the gate 514 so that the gate 508 develops a true output signal. The gate 506 thus develops a false signal which maintains the gate 508 developing a true signal. The signal on the lead 519 remains true after clock time so that a false output signal is maintained by the gate 506 and a true output signal by the gate 508 providing a stable "one" state for the flip flop with a true output level. The flip flop operates in a similar manner when storing a true state and the informational inputs are all true at clock time to change the gate 506 to a state of having a positive output which is the stored zero state. The delay lines 516 and 518 provide delays of the input signals so that information may be reliably interrogated from the terminals 509 and 510 at the beginning of a clock period and new information may be written therein during the same clock period. It is to be noted that the signal at the control input terminal 524 must be true at clock time for the flip flop to change state. If the signal at the control input terminal 524 is false at clock time, the flip flop remains in its previous state. Also if the signal at the control input terminal 524 is maintained at a true level, the flip flop is reset to the true state at clock time if all of the informational input signals are true.

Figure 11:
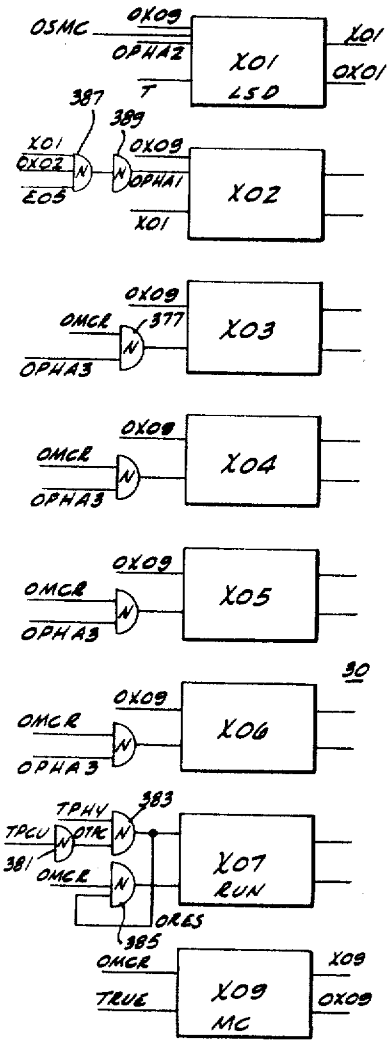
FIG. 11 is a schematic block and circuit diagram of the program control unit sequencer register of FIG. 1 which is controlled by the system of the invention to automatically restart the computer after correction of a power failure.

Referring now to FIG. 11, the flip flops of the program control unit sequencer 30 of FIG. 1 are shown in further detail. Flip flops X01 and X02 are the phase counter flip flops that are normally maintained in phase with the memory phase counter flip flops E01 and E02 in response to the start memory cycle signal SMC. The flip flop X01 has informational input signals OX09, OSMC and OPHA2 and a control input terminal maintained at a true or +5 volt level. The flip flop X02 has informational input signals OX09 and OPHA1 developed by NAND gates 387 and 389 and has a control input signal X01. The signals E05, X01 and OX02 are applied to the gate 387. The flip flops X03 to X06 which determine the control level of computer operation have informational input signals OX09 and control input signals OMCR and OPHA3 which are applied to NAND gates such as 377 functioning as "AND" gates. The flip flop X07 which is the computer run flip flop has a gate 383 coupled to the informational input terminal and a gate 385 coupled to the control input terminal. The gate 383 develops a true signal to reset the flip flop to the false state when the signal TPCU is true and OMCR is false, the signal TPCU being inverted in a gate 381 to develop a signal OTPC. When the signal TPCU goes false and TPHY is true, the flip flop X07 may be triggered to the "one" or run state when a signal ORES is false as developed by the gate 383. The master clear flip flop X09 has its control terminal maintained at a +5 volt or true level and receives a signal OMCR at its informational input terminal. Thus when MCR goes true, the flip flop X09 is set true and when MCR goes false, the flip flop X09 is set false.

To further explain the operation of the X register, the master clear flip flop X09 is held false by the OMCR signal being true during normal computer operation. As the control input is continually true, the flip flop is set to a true or "one" state at the next clock pulse after the TPCU signal going true causes OMCR to go false. At the same time during a system failure operation, the run control flip flop X07 is reset to a false state because the TPCU signal is true and the OTPC signal is false. When the signal OMCR goes false (FIG. 13), the control input signal is true so that the flip flop X07 is reset in response to the following clock pulse. Because the signal OX09 goes false, and the signal OMCR goes false, the flip flops X01 to X06 are all set to a "one" state at clock time. The condition of all flip flops X01 to X06 being in "one" states provides a control condition that inhibits all operations in the computer system during a failure condition. The run flip flop X07 being in the "zero" state also prevents the computer from operating.

Figure 13:
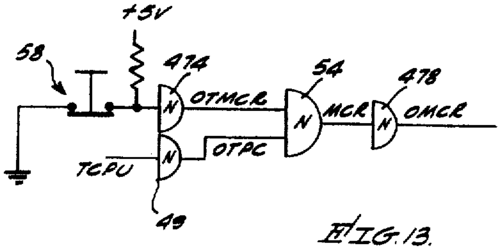
FIG. 13 is a schematic block and circuit diagram of a gating arrangement to develop a master clear signal in response to a power failure condition.

Upon correction or removal of the failure condition, the signal OTPC goes true and MCR goes false, resulting in the signal OMCR going true (FIG. 13). As a result, the master clear flip flop X09 goes false in response to the next clock pulse. Also, at the same clock pulse time, the control input to the flip flop X07 is true, TPHY remains true, and OTPC has gone true to develop a false control input so that the flip flop X07 is set true or in the running condition. Because the flip flops X01 through X06 have all true input signals at the informational terminals, flip flops X01 through X06 are set to the "zero" state at the next clock time after OX09 goes true. This configuration of X03 to X06 being in "zero" states develops a control signal in the computer that transfers the contents of the program counter to the memory address register. Also the configuration of X03 to X06 or LEV00 in FIG. 11 with the conditions that $\overline{X01}$ and $\overline{X02}$ are both true develop a start memory cycle control signal SMC (FIG. 12).

During normal counting operation, the flip flop X01 is set true as OSMC goes false to develop a phase ONE or PHA1 state of 01 where X01 is the least significant bit. In response to the next clock pulse, X01 is reset to 0 as all informational input signals are true and X02 is set to ONE as the signal OPHA1 is false to change the counter to the phase 2 state. It is to be noted that the OPHA1 signal is developed by the gates 387 and 389 and OPHA1 is true when X01, OX02 and E05 are true. The OPHA2 signal is developed by AND gates (not shown) responding to a coincidence of a 10 state. In response to the next clock pulse, X01 is set true as OPHA2 is false so that the counter changes to state PHA3. In response to the next clock pulse X01 and X02 are reset to 00 as all informational inputs are true to develop the reset state PHA0.

Figure 12:
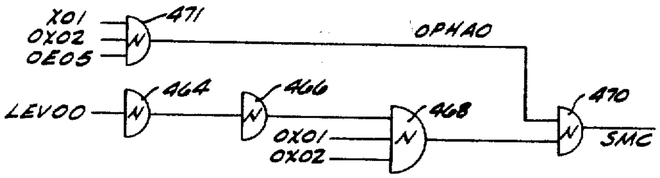
FIG. 12 is a schematic block and circuit diagram of a gating arrangement to develop a logical signal to restart the memory phase counter.

The arrangement of gates shown in FIG. 12 develops a memory write request signal SMC after power has been properly restored to the computer system. A NAND gate 464 responds to LEV00 representing flip flops X03 to X06 in the zero state to apply a false signal to a NAND gate 466 operating as an inverter and in turn to a NAND gate 468 operating as an "AND" gate. Signals OX01 and OX02 are also applied to the gate 468 which develops a false output signal when flip flops X01 to X06 are in the false states. A NAND gate 470 responds to the gate 468 to develop the signal SMC in the true state when the flip flops X01 to X06 are in the zero states. To maintain the SMC signal true during a starting operation after removal of a failure condition with the flip flops X01 and X02 changing to the 01 state, a NAND gate 471 applies a false signal OPHA0 to the gate 470 when X01, OX02 and OE05 are true. Other input signals may be applied to the gates of FIG. 12 for normal computer control as is well known in the art.

To further explain the development of the master clear signal OMCR, the arrangement of FIG. 13 shows the switch 58 applying a true signal through a NAND gate 474 during normal computer master clear operation and to the gate 54 functioning as an "OR" gate. For the memory protection operation, the signal OTPC is applied to the gate 54 from the NAND gate 49 to develop a true signal MCR in response to a memory power failure. The gate 49 inverts the signal TPCU to develop the signal OTPC. A NAND gate 478 operating as an inverter develops the signal OMCR in the false state during occurrence of a failure condition to set the flip flops X03 to X06 to the true states, the flip flop X07 to the false state and the flip flop X09 to the true state.

Referring now to the waveforms of FIG. 14 as well as to FIGS. 3, 4, 5 and 6, the operation of the memory protection system will be explained in further detail. The regulated voltage on the lead 42 of FIG. 3 may be normally maintained at a selected level of +12.5 volts as shown by a waveform 480. When the unregulated voltage of the waveform 480 falls due to a fluctuation or failure of the A.C. power source 90, the subsequent failure of the regulator 44 to maintain regulated voltage is anticipated before occurrence thereof. As shown in FIG. 4, the voltage on the lead 42 is compared with the substantially constant voltage drop across the zener diodes 190 and 194 to develop a negative going voltage on the lead 116 when the voltage on the lead 42 falls, which is amplified and applied through the lead 120 to the base of the transistor 232 of the threshold detector 122. It is to be noted that negative voltage transients on the lead 42 less than a selected time duration are prevented by the capacitor 200 from providing a trigger signal on the lead 116. At a threshold level at which the diode 230 is biased into conduction, the transistor 232 is biased out of conduction to apply a positive signal to the leads 126 and 127.

The positive signal on the lead 126 is inverted in the gate 137 (FIG. 6) and applied as a negative signal through the diode 367 and the network 368 to bias the transistor 362 out of conduction which in turn biases the transistor 360 into conduction to apply a negative or ground level pulse of a waveform 482 to the lead 151 and a positive pulse to the lead 134. The pulse of the waveform 482 has a duration of approximately 7.5 milliseconds before the time constant of the one-shot circuit 128 biases the transistor 360 out of conduction. The positive signal on the lead 134 is applied through the inverting gate 136 to the gate 146 to initially develop the signal TPHY of a waveform 488. The signal on the lead 151 is applied to the gate 141 to activate the inhibit control source 150. Signals are applied to the "OR" gate 129 (FIG. 4) from the lead 127 and from the one-shot circuit 128 and the lead 123 to the lead 240 to bias the transistor 242 of the relay driver 130 out of conduction. The relay driver 130 is thus biased out of conduction so that after a characteristic relay delay time of approximately 5 milliseconds, the −40 volts and +40 volts are removed from the leads 131 and 133 and from the read-write current source 86. Also the contact 258 removes the −40 volts of the terminal 260 from the diode 256 so that the capacitor 250 discharges to prevent the relay driver from being energized for at least 40 milliseconds. Thus the one-shot circuit 128 inhibits the current source, deenergizes the relay driver and develops the signal TPHY for initiating the locking of the memory phase counter (E01 and E02).

When the relay opens after approximately 5 milliseconds, the −40 volt signal is removed from the lead 160 and the Schmitt trigger circuit is triggered as indicated by a waveform 486 representing the signal after inversion by the gate 166. The negative signal on the lead 145 is applied through the gate 146 to maintain the true signal TPHY. The signal TPCU of a waveform 490 is also applied from the lead 52 to the gates of FIGS. 11 and 13 to reset the run flip flop X07 and develop the signal MCR.

The signal of the waveform 486 is applied through the gate 141 functioning as an "OR" gate to maintain the transistor 370 biased heavily into conduction after termination of the pulse of the waveform 482 developed by the one-shot circuit 128. A negative going signal of a waveform 483 is applied to the lead 153 to inhibit the current source 86 upon triggering of the one-shot circuit 128. A 2 microsecond delay of the signal of the waveform 483 is provided by the capacitor 383 to allow completion of a current memory cycle before inhibiting the current source 86. The capacitors 392 and 394 are selected so that the signal of the waveform 483 is held below ground for a period of 40 milliseconds, thus insuring that the read-write current source is inhibited during failing voltages while the capacitors such as 436 and 422 (FIG. 7) are discharged.

As a result of the signal TPHY going to a true level, the memory phase counter of FIG. 3 has stopped or locked at the end of the current cycle and the master clear signal MCR has set the flip flops X01 to X06 and X09 of the PCU sequencer (FIG. 11) to "one" states. The read-write current source 86 is inhibited by the output signal of the trigger circuit as shown by the waveform 486. When the voltage on the lead 42 rises to an in-tolerance level as shown by the waveform 480 to anticipate the voltage regulators returning to normal operations, the signal on the lead 116 (FIG. 4) rises to bias the transistor 232 into conduction as well as the transistor 242 of the relay driver 130 to energize the relay 132. As a result, the −40 volts and +40 volts are applied to respective leads 131 and 133 and to the read-write current source 86 of FIG. 6. As the contact 258 closes, the −40 volts at the terminal 260 is applied to the lead 160. However, the capacitor 318 and the resistors 288 and 320 provide a delay time of 90 milliseconds before the voltage falls at the base of the transistor 284 to a level to bias the transistor 284 out of conduction and the transistor 286 into conduction and apply the signal TPCU of the waveform 490 at a false level to the lead 164. The negative going signal on the lead 164 is then inverted in the gate 166 and delayed approximately 2 microseconds by the charge time of the capacitor 354. The gate 146 then responds after this 2 microsecond delay so that the TPHY signal of the waveform 488 falls to allow the phase counters to be energized. The signal TPHY is delayed to allow the TPCU to perform logical functions in the PCU sequencer 30 as shown in FIG. 11 before the memory is enabled. When the signal TPHY falls, the signal of the waveform 483 rises so that the current source 86 is no longer inhibited by that signal, the 90 millisecond delay having allowed all system voltages to return to regulated values.

Referring now principally to the waveforms of FIG. 15, as well as to FIGS. 11, 12 and 13, the memory protect operation including the automatic starting of the computer and memory will be explained in further detail. The rest or stop state of the memory phase counter flip flops E01 and E02 of FIG. 3 is PHY00 in which both flip flops are in the zero state. A clock signal of the waveform 520 is applied to each flip flop in the system as explained relative to FIG. 10. The PHY00 and PHY 01 signals of respective waveforms 522 and 524 are developed during the corresponding phase periods by the decoding network 186 of FIG. 3. The start memory cycle or SMC signal of a waveform 526 is applied in an inverted form $\overline{SMC}$ to the flip flop E01 during each PH00 time of normal operation to change the least significant bit to a one state so that the 01 or phase 01 state is provided. The normal counting operation continues in a manner previously discussed.

During the normal read-write cycle, the read switches of the read-write switching circuits 74 and 76 of FIG. 2 are closed during PHY 01 time and opened at the end of PHY02 time in response to the timing pulse of a waveform 530. The switches are selected in response to a memory address applied to the address register 12 during PHY00 as indicated by a waveform 532. The address is gated into the flip flops of the address register 12 in response to the SMC signal of the waveform 526.

After the proper read switches and return switches are closed in response to the signal of the waveform 530, the read current circuit 400 of FIG. 7 is gated by a timing pulse of a waveform 534 developed by the timing circuit 412 to apply a current pulse having a similar configuration as the waveform 534 through the selected X and Y drive lines such as 68 and 70 of FIG. 2. The sense amplifiers 82 respond to the sensed binary information in response to a strobe pulse of a waveform 538 during PHY02 time. During the write portion of the cycle which is during PHY03 and PHY04 times, an inhibit pulse of a waveform 540 is applied from the inhibit drivers 80 to inhibit lines such as 72 when the data register 14 requires a zero to be written into a bit position. The data register 14 may be controlled, as well known in the art, to either receive new information during PH02 time or to receive the data strobed through the sense amplifiers 82. After the inhibit currents are applied through the memory, the write switches and return switches are closed to select the previously interrogated word position as determined by the address in the address register 12. This is accomplished by the timing pulse of a waveform 542 being applied to the circuits 74, 76, 75 and 78 from the clock and delay line timing source 37 and 39 of FIG. 1 to activate the write and return switches. Shortly after the pulse of the waveform 542 rises, a timing pulse of a waveform 546 is applied from the clock source to the write current source 402 of the source 86 to apply X and Y current pulses through the selected leads having a configuration in time similar to the waveform 546. Each memory cycle continues in a similar manner in response to an SMC signal of the waveform 526 as developed in the program control unit by a gating arrangement similar to that shown in FIG. 12 but which may apply a false signal to the gate 470 in response to only $\overline{X01}$ and $\overline{X02}$ being true.

Upon the occurrence of the unregulated voltage falling in value, the TPHY signal of a waveform 548 is developed on the lead 148 and applied through the lead 182 of FIG. 3 to the gate 180 functioning as an "OR" gate. This failure condition may occur at any time during a memory cycle such as at times 550, 552, 554 and 556. Also, a power failure may occur when the memory is in PHY00 time and not operating. However, the memory phase counter continues in accordance with the principles of the invention to complete any currently operating memory cycle so that a stored instruction, for example, is not destroyed. Because the gate 180 functions as an "OR" gate, the control signal applied to the flip flop E01 is true whenever the TPHY or PHY00 signals are false. Thus, when the signal TPHY goes true, the gate 180 maintains a true output signal until PHY00 becomes true at which coincidence condition, a false control signal is applied to the control terminal of the flip flop E01 to halt the operation of the memory phase counter. Therefore, when the signal TPHY occurs at times such as at 550, 552, 554 or 556, the memory phase counter of FIG. 3 continues until a time at 528 and is then locked in state PHY00.

Figure 15:
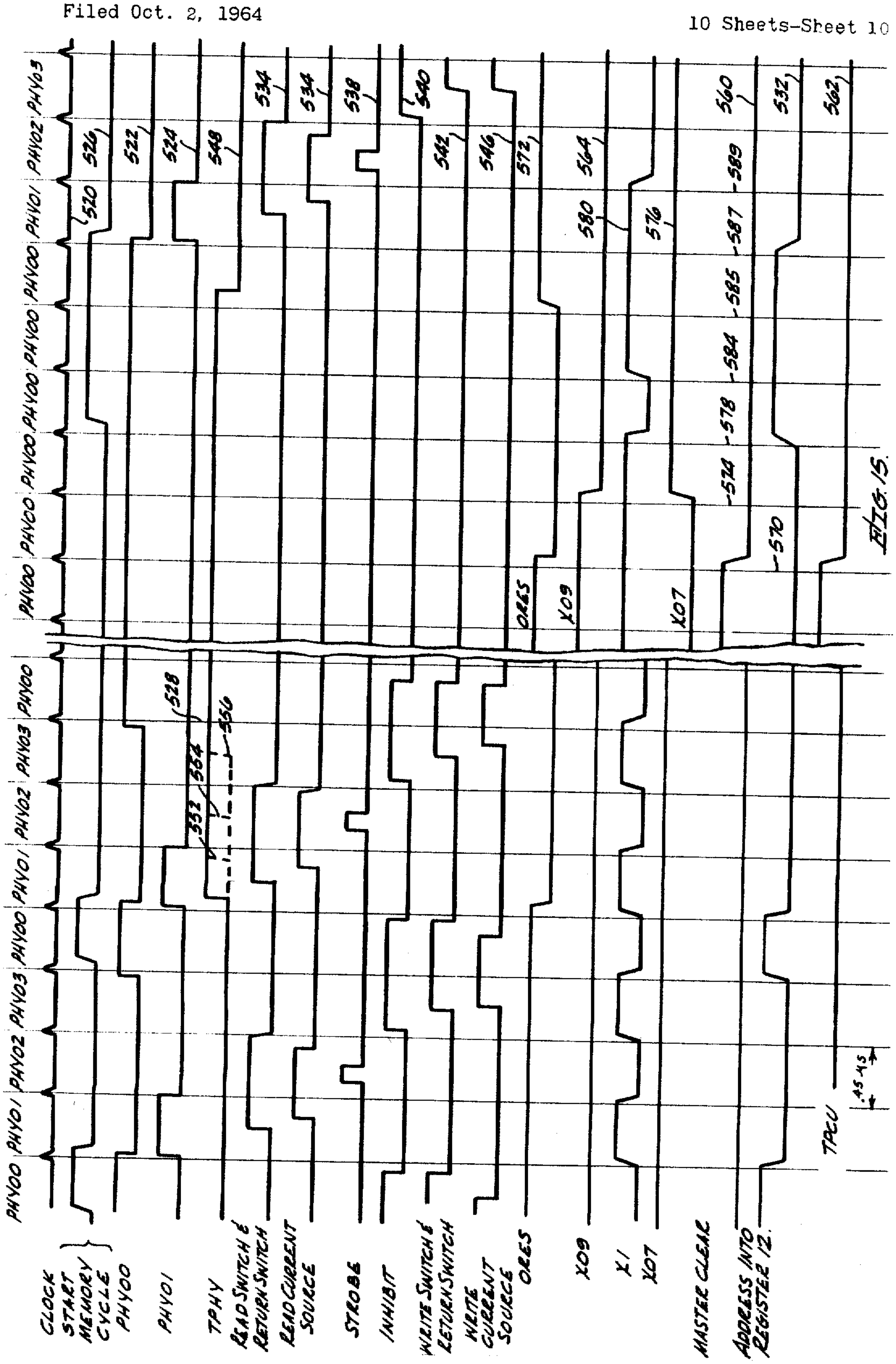
FIG. 15 is a schematic diagram of waveforms of voltage as a function of time for further explaining the operation of the system in accordance with the invention.

The signal TPCU which is developed approximately 5 milliseconds after TPHY as shown by a waveform 562 of FIG. 15 is applied from the lead 52 to the gate 49 and to the gate 54 of FIG. 13. As the signal TPCU goes true, the signal MCR goes true and the signal OMCR goes false. At the next clock time the signal OMCR at a false level triggers the master clear flip flop X09 to the "one" state. At the next clock time, the flip flops X01 to X06 are set to the "one" state as the false output terminal of the flip flop X09 is applied to the informational input and the control input goes true in response to OMCR. At the same time as the flip flop X09 goes false, the run flip flop X07 is reset to the zero state as the control input signal goes true in response to the signal of OMCR, the signals TPCU and TPHY being true so that a true signal is applied to the information input terminal.

As may be seen in FIG. 1, the signal OMCR is also applied to gates such as 27 which may be coupled to the control inputs of each flip flop of the program counter 26. Thus, the memory address of the next instruction to be accessed is changed to 000. The control flip flop E05 of FIG. 3 is also reset to the zero state as OMCR is false and SMC is false.

Because the MCR signal and the TPCU signal change to the true states approximately 5 milliseconds after occurrence of the failure, respective waveforms 560 and 562 of FIG. 15 are shown changing level during the period of time included in the broken lines. Thus upon occurrence of a failure condition, the memory completes its current four-phase cycle, the address is changed in the program counter 26 to a predetermined memory address and the control flip flops of the PCU sequencer are set to a state that prevents the computer from requesting any further operation.

Figure 14:
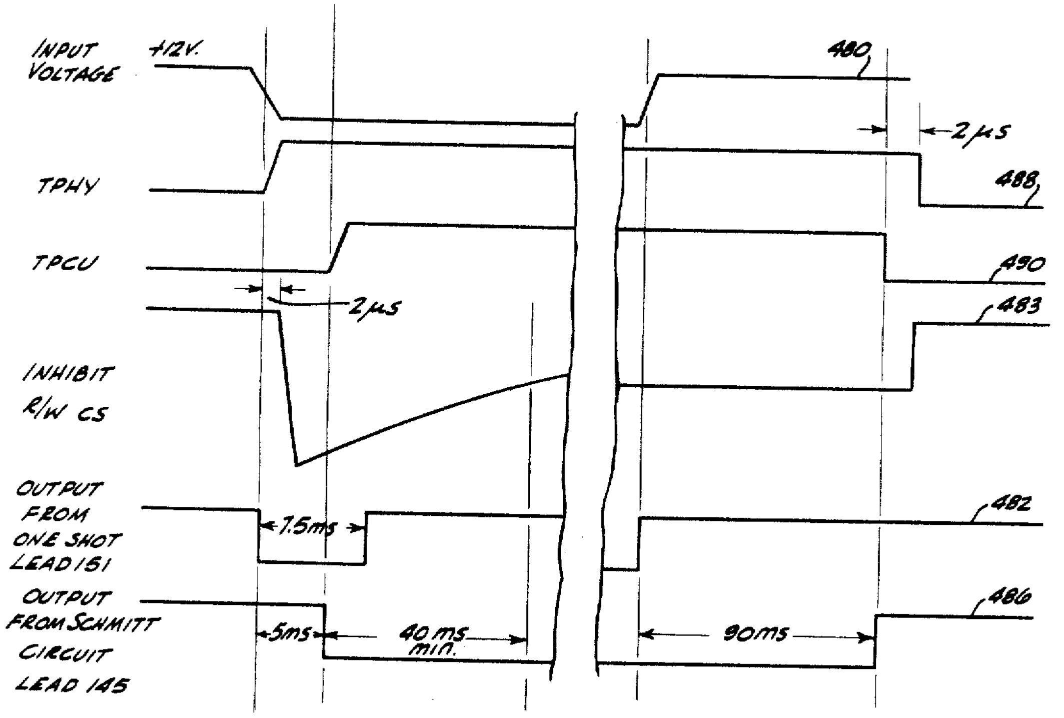
FIG. 14 is a schematic diagram of waveforms of voltage as a function of time for explaining the operation of the memory protection system in accordance with the invention.

When the fault condition has been corrected as shown by the waveform 480 of FIG. 14, the signal TPCU goes false after approximately 90 milliseconds of delay. Also, voltages are restored to other circuits throughout the memory and computer during this 90 millisecond period. Because of the capacitive elements utilized in the regulated supplies, a relatively long time is required to restore all voltages thereat. The signal TPCU shown by waveform 562 of FIG. 15 goes false after a clock time 570 and the signal MCR goes false at the gates of FIG. 13. At the same time, the signal ORES of a waveform 572 goes false at the informational input terminal of the flip flop X07 of FIG. 11. As a result, the master clear flip flop X09 is reset to zero at a clock time 574 in response to the following clock pulse, the flip flop X09 being shown by a waveform 564. In response to the signals TPCU and TPHY of the respective waveforms 562 and 548 at the clock time 570, the gate 383 (FIG. 11) develops the false signal ORES of the waveform 572 which is applied to the informational input of the run flip flop X07. Thus, because ORES is false and the signal is true at the control input terminal, the run flip flop X07 is set to a true state at the following clock time 574 as shown by a waveform 576. At the following clock time 578 the flip flops X01 to X06 are reset to the zero state as indicated by a waveform 580 which represents only the flip flop X01. The flip flops X01 to X06 are reset because OX09 is true and OPHA3 is false.

In the illustrated computer, the states of X06 to X01 of 00 00 00 represent a starting control condition for accessing an instruction from memory at the address stored in the program counter 26. However, the memory does not operate until an SMC signal is developed and the signal TPHY goes false. The SMC signal goes true when OX01 and OX02 go true after clock time 578 and LEV00 is true, that is, the flip flops X03 to X06 are set to the zero state. At clock time 584, the flip flop X01 of FIG. 11 responds to OSMC or the inverted form of SMC to be triggered to the "one" state which state is retained until clock time 589. The signal SMC also gates the contents of the program counter 26 of FIG. 1 through the composite lead 29 to the address register 12 shortly after clock time 578 as indicated by the waveforms 572. It is to be noted that in other arrangements in accordance with the invention the 000 address in the address register 12 may be effectively transferred by resetting the flip flops thereof. Thus the flip flop X01 is set true at clock time 584 after the signal SMC goes true and remains in that state for three clock periods until synchronized with the memory phase counter at clock time 589. Flip flops E01 and E02 are inhibited in state 00 until TPHY goes false at clock time 585. Thus at clock time 587, flip flop E01 goes true as OSMC is false (FIG. 3). Also at time 587 the flip flop E05 goes true as SMC and PHY00 are both true at the informational input terminal and PHA0 is false. When the signal OE05 goes false shortly after time 587, the SMC signal goes false at the gate 470 of FIG. 12. Thus the gate 471 maintains SMC true while flip flop X01 is in the true state and flip flop E05 is in a false state. At clock time 589 the two phase counters are in synchronism and change to phase 2 or PHY02. Normal memory operation then continues to PHY03 and PHY04.

Thus at times 585 and 587, an instruction word is read from the selected memory address, which is 000 (FIG. 1) in the example, into the data register 14 to be available for transfer at PHY02 time. The instruction word in the data register may be rewritten into the same memory location during the following PHY03 and PHY00 times. At the same time, other control signals (not shown) transfer the instruction word into the B register 16 and the command register 28. The instruction which may be a transfer request to an address contained in the transfer instruction is then executed in a manner as is well known in the art.

The transfer address may be the start of a recovery routine that will start the programmed problem either from the beginning or from a desirable starting point. Thus the system in accordance with the invention, not only preserves the information stored in memory during a power failure but also starts the computer operating upon correction of the power fault or transient. Because the stored program is preserved in memory, a problem may be resolved without going through a slow program load routine. Also in some types of problems, the data is used to continue solution, although the computer may not have an indication of what point in the main routine the solution was interrupted.

Thus, there has been described a memory protection system that anticipates failure of the regulated voltage by responding to a predetermined voltage change of the unregulated voltage. It is to be understood that the principles of the invention are applicable to sensing either a rise or fall of the unregulated voltage. The system then provides signals to positively inhibit the current supplied to the memory and to disconnect the power sources from the sources of memory currents. A currently operating memory cycle is completed before inhibiting the memory operation. A control signal is applied to the program control unit of the computer to inhibit operation thereof and to develop a new memory address for the computer to use upon return to operation. Although the memory protect system may sense voltage at only one level, it represents failure of all voltage levels utilized throughout the system. The system responds to low voltage transients only of a greater period of time than a predetermined minimum time. When the sensed voltage returns to an in-tolerance condition, the memory driving current sources are activated for a sufficient period to charge all storage elements thereof before restoring memory operations. When the memory is again enabled into a cycle, a stored instruction is accessed from the return memory location for starting the computer into its main routine at a proper starting point. Thus the system of the invention not only allows a memory cycle to be completed before inactivating the memory, but automatically starts the computer into its programmed routine upon removal of the power failure. The system of the invention results in a minimum time being lost in response to power fluctuations.

What is claimed is:

1. A system for protecting a computer memory from destruction of stored information including program information during voltage failure at a power supply, said memory operating in cycles at memory addresses transferred from a program counter, said memory having a read-write current source comprising first means for sensing the voltage at said power supply and responding to a voltage failure condition, second means responsive to said first means for deenergizing the read-write current source and for stopping the operation of said memory on termination of the currently operating cycle, and third means responsive to said first means for developing a return address in said program counter during said voltage failure condition and for initiating the operation of said memory at said return address upon removal of said voltage failure condition.

2. A system for protecting a computer memory during power supply variations from an in-tolerance range, said memory operating in cycles each having a plurality of phases and in response to memory addresses developed by control means, comprising first means for sensing the voltages supplied to the power supply, second means responsive to said first means for disconnecting the voltages from selected portions of said memory and for stopping the operation of said memory at the end of a cycle, third means responsive to said first means for terminating the operation of said computer, and fourth means responsive to said first means for initiating the operation of said memory at a predetermined address upon the return of said power supply to said in-tolerance range.

3. A system for controlling a computer system during a power supply fault, said power supply developing system voltages in response to unregulated voltages, said computer including a memory operating in repetitive cycles in response to a source of current pulses comprising first means for sensing a selected unregulated voltage to anticipate the voltages supplied to said memory, second means for responding to the selected unregulated voltage falling to an out-of-tolerance value to inhibit the voltages supplied to the source of current pulses and to stop a present memory cycle at the termination thereof, said second means returning the supplied voltages and releasing the memory to perform a memory cycle when the selected unregulated voltage returns to an in-tolerance condition, and third means for inhibiting the computer operation, for developing a computer start address when the selected unregulated voltage changes to an out-of-tolerance value and for starting the computer operation at the start address when the selected unregulated voltage changes to an in-tolerance value.

4. A system for controlling a memory during voltage failures at a power source, said memory operating in repetitive read-write cycles comprising sensing means coupled to the power source, first means responsive to said sensing means for disconnecting said power source from selected portions of said memory during a voltage failure, second means responsive to said sensing means for controlling said memory to complete a currently operating read-write cycle upon occurrence of a voltage failure, and third means responsive to said sensing means for developing a memory address for return to operation upon removal of said voltage failure.

5. A system for controlling a computer magnetic memory to protect information stored therein from voltage failures at a power source, said memory operating in repetitive read-write cycles and having a current source for switching said magnetic elements, comprising detecting means coupled to the power source for responding to a voltage failure condition, first means responsive to said sensing means for inhibiting the current source during a voltage failure, second means responsive to said detecting means for controlling said memory to complete a currently operating read-write cycle upon occurrence of a voltage failure, and third means responsive to said detecting means upon occurrence of a voltage failure for developing a memory address and for controlling said memory to start operation at said address upon removal of said voltage failure.

6. A memory protection system for controlling the memory to complete a currently operating four phase read-write cycle upon occurrence of a voltage failure at a power supply, one of said phases being a rest phase occurring at the completion of each memory cycle comprising sensing means coupled to said power supply for developing a first signal during a voltage failure, counting means coupled to said memory for developing a control signal during each of the four memory phases, and gating means coupled to said counting means and to said sensing means to inhibit operation thereof upon coincidence of said first signal and said control signal representing the rest phase.

7. In a computer a memory protection system for controlling the memory to complete a currently operating four phase read-write cycle upon occurrence of a voltage failure at a power supply, one of said phases being a rest phase occurring at the completion of each memory cycle comprising sensing means coupled to said power supply for developing a first signal during a voltage failure, counting means coupled to said memory for developing a control signal during each of the four memory phases, first gating means coupled to said counting means and to said sensing means to inhibit operation thereof upon coincidence of said first signal and said control signal representing the rest phase, and program control means coupled to said sensing means and to said counting means for inhibiting the computer upon occurrence of a voltage failure and for starting the operation of said counting means upon correction of said voltage failure condition.

8. A system for protecting a computer memory from destruction of stored information including program information during power supply variations from an intolerance range, said memory operating in cycles each having a plurality of phases and in response to memory addresses developed by computer control means comprising first means for sensing voltages supplied to the power supply and responding to a power supply variation from the in-tolerance range, second means responsive to said first means for disconnecting the voltages to selected portions of said memory and for stopping the operation of said memory at the end of a current cycle, third means responsive to said first means for terminating the operation of said computer during said power supply variation and developing a return address for entering the computer program, and fourth means responsive to said first means for initiating the operation of said memory at said return address upon the return of said power supply to said in-tolerance range.

9. A system for protecting a computer memory from destruction of stored information including program information during power supply variations from an intolerance range, said memory operating in cycles, said memory having an instruction stored in a start address for returning to a start point of the program comprising detecting means for sensing the voltages supplied to the power supply and responding to a power supply variation from the in-tolerance range, second means responsive to said first means for disconnecting the voltages to selected portions of said memory and for stopping the operation of said memory at the end of a currently operating cycle, third means responsive to said first means for terminating the operation of said computer during said power supply variation and developing said start address for entering the computer program, and fourth means responsive to said first means for transferring said start address to said memory and initiating the operation of said memory at said return address upon the return of said power supply to said in-tolerance range.

10. A control system for a computer system having a memory with driving current means and with a phase counter for controlling a plurality of phases of each memory read-write cycle comprising a plurality of sources of unregulated voltage, a plurality of voltage regulators each coupled to a source of unregulated voltages, selected ones of said regulators coupled to the driving current means, detecting means coupled to a selected one of said sources of unregulated voltage and said driving current means for disconnecting driving current when the sensed voltage varies from an in-tolerance condition, first control means coupled between said detecting means and the phase counter to inhibit said phase counter at the termination of a memory cycle when the sensed voltage varies from said in-tolerance condition and to energize said phase counter when the sensed voltage returns to said in-tolerance condition.

and second control means couplied between said detecting means and said computer for inhibiting computer operation when the sensed voltage is out of said intolerance condition and developing a predetermined memory address, said second control means controlling said computer to access said memory at the predetermined address when the sensed voltage returns to said in-tolerance condition.

11. A system for controlling a computer memory during voltage failures at a power source, said memory storing information including a program of instruction words and operating in repetitive read-write cycles to derive the instruction words at addresses provided by a program counter, said memory including a read-write current source comprising sensing means coupled to the power source, first means responsive to said sensing means for inhibiting the read-write current source during a voltage failure, second means responsive to said sensing means for controlling said memory to complete a currently operating memory cycle upon occurrence of a voltage failure, and third means responsive to said sensing means for controlling the program counter to develop a return address upon occurrence of a voltage failure and for controlling said memory to start a read-write cycle at said return address upon termination of said voltage failure, said return address including an instruction word for starting the computer operating in the program.

12. A system for protecting a memory during power failure conditions, said memory having a phase counter for controlling read-write cycles and having memory driving circuits comprising a source of unregulated voltage, a voltage regulator coupled between said source of unregulated voltage and the memory, sensing means coupled to said source of unregulated voltage for responding to the unregulated voltage changing in amplitude relative to a predetermined amplitude, said unregulated voltage having first and second ranges of amplitudes on opposite sides of said predetermined amplitudes, first means coupled to said sensing means for inhibiting the memory driving circuits when the amplitude of the unregulated voltage changes to said first range, second means coupled to said sensing means for responding to the amplitude of said unregulated voltage changing to said first range to inhibit said phase counter at the termination of a read-write cycle, and third means coupled to said sensing means for responding to the amplitude of said unregulated voltage changing to said first range to terminate operation of the computer and develop an address for a start-up operation, said third means responding to the amplitude of said unregulated voltage changing to said second range to start said computer at said developed address.

13. A system for protecting information stored in a computer memory from the effects of voltage failure at a power source, the memory having a read-write current source and operating in repetitive cycles comprising a plurality of rectifier means coupled to the power source for developing a plurality of unregulated voltages, a plurality of voltage regulators each coupled between a different rectifier means and said memory for supplying regulated D.C. voltages thereto, said regulators responding to a selected unregulated voltage changing from an operating range to a predetermined level to develop regulated voltages at out-of-tolerance levels, sensing means coupled to a point between a selected rectifier means and the corresponding voltage regulator for responding to said unregulated voltage changing to the predetermined level to which said regulator responds to develop an out-of-tolerance regulated voltage, detecting means coupled to said sensing means, first means coupled between said detecting means and the read-write current source for inhibiting currents supplied thereto in response to said unregulated voltage changing to said predetermined level, second means coupled between said sensing means and said memory for controlling said memory to complete a currently operating memory cycle when said unregulated voltage changes to said predetermined level, and third means coupled from said first means to said second means and said memory for developing a memory return address when said unregulated voltage changes to said predetermined level and for initiating said memory into operation at said return address after said unregulated voltage changes to said operating range.

14. A system for protecting information stored in a computer memory during voltage amplitude variations of the power supply from a predetermined range of amplitudes, said memory operating cycles comprising a plurality of voltage regulating means coupled to the power supply for applying regulated voltages to the memory, sensing means coupled to a point between said power supply and a predetermined voltage regulating means for responding to the voltage variations, detecting means coupled to said sensing means, current supply means including an inhibiting circuit, relay means coupled between selected ones of said plurality of voltage regulating means and said current supply means for supplying regulating currents thereto, first circuit means coupled from said detecting means to said relay means for controlling the energization thereof and to said inhibiting means for initially inhibiting said current supply means, second circuit means coupled from said relay means to said inhibiting means for maintaining a current inhibiting condition, phase counter means coupled from said first and second circuit means to said memory for controlling the cycles thereof to complete a current memory cycle when said sensing means responds to a voltage variation, and program control means coupled from said first and second circuit means to said phase counter means for inhibiting the computer operation in response to a voltage variation and for developing a memory address for return to operation, said program control means responding to said first and second circuit means to access the memory at the developed address when the voltage at the power supply returns to said predetermined range.

15. A system for protecting a computer memory during voltage failure conditions in a power supply comprising a plurality of voltage regulators coupled from the power supply to said memory, a read-write current source coupled to said memory and including means for inhibiting current supplied to said memory, relay means coupled between selected ones of said plurality of voltage regulators and said read-write current source, sensing means coupled to a point between said power supply and a selected one of said voltage regulators, detecting means coupled from said sensing means to said relay means for applying a signal to initiate said relay into an open state in response to a voltage failure condition, a first trigger circuit coupled to said detecting means to said relay means for maintaining the signal to open said relay and coupled to the inhibiting means of said read-write current source, a second trigger circuit coupled from said relay means to said inhibiting means for responding to the opening of said relay to maintain the inhibited condition while the voltages terminate at said read-write current source, hold-off means coupled to said relay means for preventing said relay from being closed for a predetermined period after opening, delay means coupled to said second trigger circuit for preventing the relay from being closed for a predetermined period upon removal of said voltage failure condition, a memory phase counter means including a gate coupled to said memory and to said first and second trigger circuits, said phase counter controlling said memory during repetitive four phase read-write cycles, a first phase signal occurring at the end of each cycle, said gate responding to a coincidence of the signal developed by said first trigger circuit and said first phase signal to inhibit said memory counter, and computer control means coupled between said second trigger circuit and said memory to develop a return address in response to said failure condition and start the memory operation at said return address after said voltage failure condition is removed and said second trigger circuit responds to the delay of said delay means.

16. A system for protecting the information stored in a computer memory from voltage failure of a power source, said memory operating in cycles and having a return to operation instruction stored in a selected address comprising a read-write current source coupled to said memory, relay means coupled between said power source and said read-write current source, sensing means coupled to said power source to develop a signal in response to a voltage failure condition, first circuit means coupled to said sensing means, said relay and said read-write current source to deenergize said relay in response to a voltage failure condition and for inhibiting said current source for a predetermined period, second circuit means coupled between said relay means and said read-write current source for responding to opening of said relay to inhibit said current source before the end of said predetermined period, delay means coupled to said second circuit means to maintain said read-write current source inhibited for a predetermined delay period after removal of said voltage failure condition, a first gate coupled to said first and second circuits to develop a memory inhibiting signal, a memory phase control counter coupled to said memory, said counter developing a plurality of phase control signals for each memory cycle with a first phase control signal being formed at the end of each memory cycle, a second gate coupled to said first gate and said memory counter for responding to a coincidence of said memory inhibiting signal and said first phase control signal to inhibit said phase counter, and program control means coupled to said second circuit means, said memory and said memory phase counter to develop said predetermined memory address in response to a voltage failure and to control said memory phase counter to address the instruction in said selected address upon removal of said failure condition.

References Cited by the Examiner

UNITED STATES PATENTS

| | | | |
|---|---|---|---|
| 3,037,698 | 6/1962 | Saxenmeyer | 235—153 |
| 3,167,685 | 1/1965 | Bade et al. | 340—172.5 X |
| 3,188,452 | 6/1965 | Asbury | 340—172.5 X |
| 3,248,697 | 4/1966 | Montgomery | 340—146.1 |

ROBERT C. BAILEY, *Primary Examiner.*

P. J. HENON, *Assistant Examiner.*